United States Patent
Lee et al.

(10) Patent No.: US 12,127,210 B2
(45) Date of Patent: Oct. 22, 2024

(54) METHOD FOR TRANSMITTING AND RECEIVING DOWNLINK CONTROL INFORMATION BETWEEN TERMINAL AND BASE STATION IN WIRELESS COMMUNICATION SYSTEM AND DEVICE FOR SUPPORTING SAME

(71) Applicant: LG Electronics Inc., Seoul (KR)

(72) Inventors: Kilbom Lee, Seoul (KR); Hyungtae Kim, Seoul (KR); Kyuseok Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 17/422,117

(22) PCT Filed: Jan. 7, 2020

(86) PCT No.: PCT/KR2020/000239
§ 371 (c)(1),
(2) Date: Jul. 9, 2021

(87) PCT Pub. No.: WO2020/145609
PCT Pub. Date: Jul. 16, 2020

(65) Prior Publication Data
US 2022/0124686 A1     Apr. 21, 2022

(30) Foreign Application Priority Data

Jan. 10, 2019 (KR) .................. 10-2019-0003556

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/0446* (2013.01); *H04W 72/0453* (2013.01); *H04W 72/0466* (2013.01)

(58) Field of Classification Search
CPC ... B81B 7/02; B81C 1/00015; B81C 1/00476; B81C 1/00936; B81C 2201/0132; H01L 21/02049; H04L 5/0051; H04L 1/00
See application file for complete search history.

(56) References Cited

U.S. PATENT DOCUMENTS

2018/0343653 A1* 11/2018 Guo .................... H04W 72/542
2020/0187171 A1* 6/2020 Hwang ................. H04W 72/23
(Continued)

FOREIGN PATENT DOCUMENTS

| KR | 20180064499 | 6/2018 |
|---|---|---|
| KR | 20180106859 | 10/2018 |
| WO | WO2018231490 | 12/2018 |

OTHER PUBLICATIONS

International Search Report and Written Opinion in International Appln. No. PCT/KR2020/000239, dated Apr. 24, 2020, 16 pages (with English translation).
(Continued)

*Primary Examiner* — Zhensheng Zhang
(74) *Attorney, Agent, or Firm* — Fish & Richardson P.C.

(57) ABSTRACT

The present disclosure provides a method for transmitting and receiving downlink control information (DCI) between a terminal and a base station in a wireless communication system and a device for supporting same. According to an embodiment applicable in the present disclosure, a terminal can recognize/expect that multiple control resource sets (CORESETs) include identical DCI, on the basis of con-
(Continued)

figuration information received from a base station, and on the basis thereof, can receive the DCI via at least one of the multiple CORESETs.

17 Claims, 22 Drawing Sheets

(51) Int. Cl.
*H04W 72/044* (2023.01)
*H04W 72/0446* (2023.01)
*H04W 72/0453* (2023.01)

(56) References Cited

U.S. PATENT DOCUMENTS

2020/0196284 A1\* 6/2020 Wang ................... H04W 72/23
2021/0250981 A1\* 8/2021 Takeda ............... H04W 72/1273

OTHER PUBLICATIONS

ETRI, "PDCCH design for multi-beam operation," R1-1720231, Presented at 3GPP TSG RAN WG1 Meeting #91, Reno, USA, Nov. 27-Dec. 1, 2017, 6 pages.

\* cited by examiner

FIG. 6
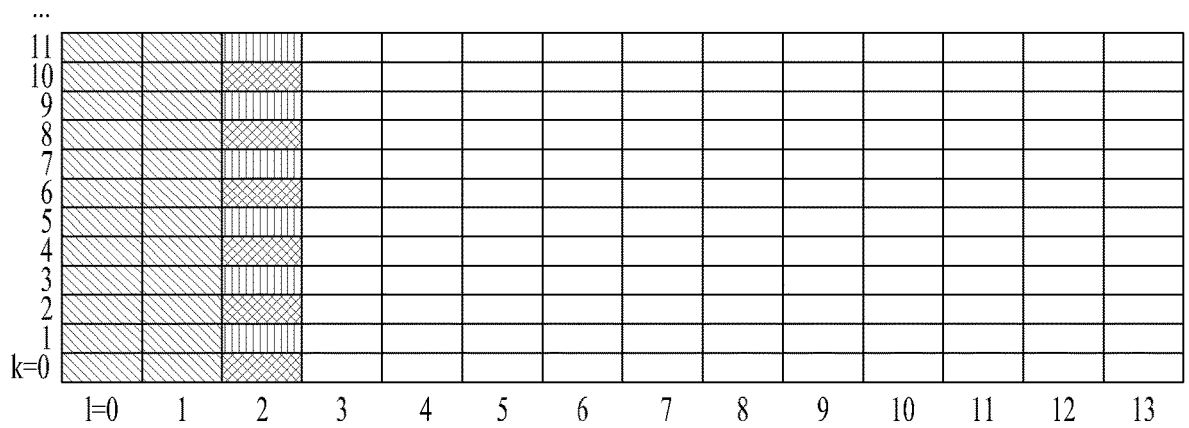
(a)
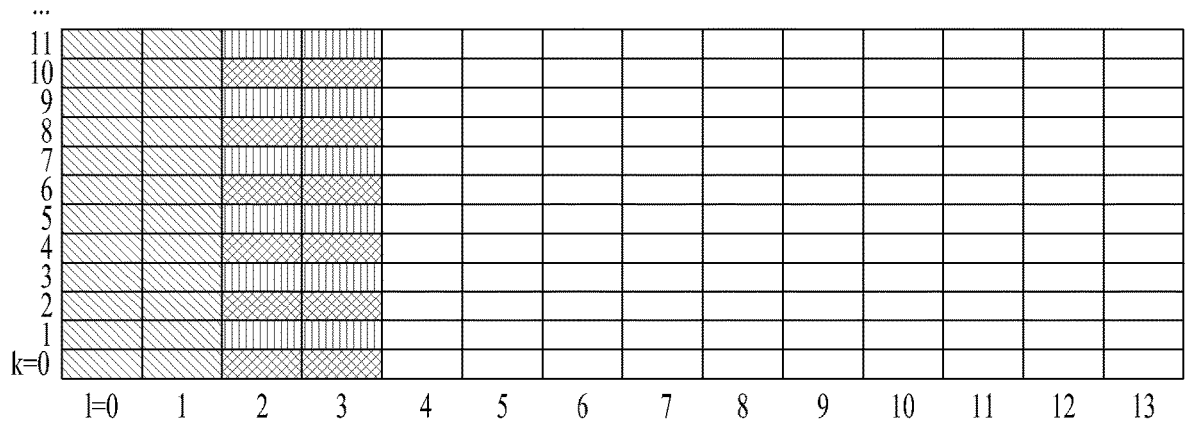
(b)

FIG. 7

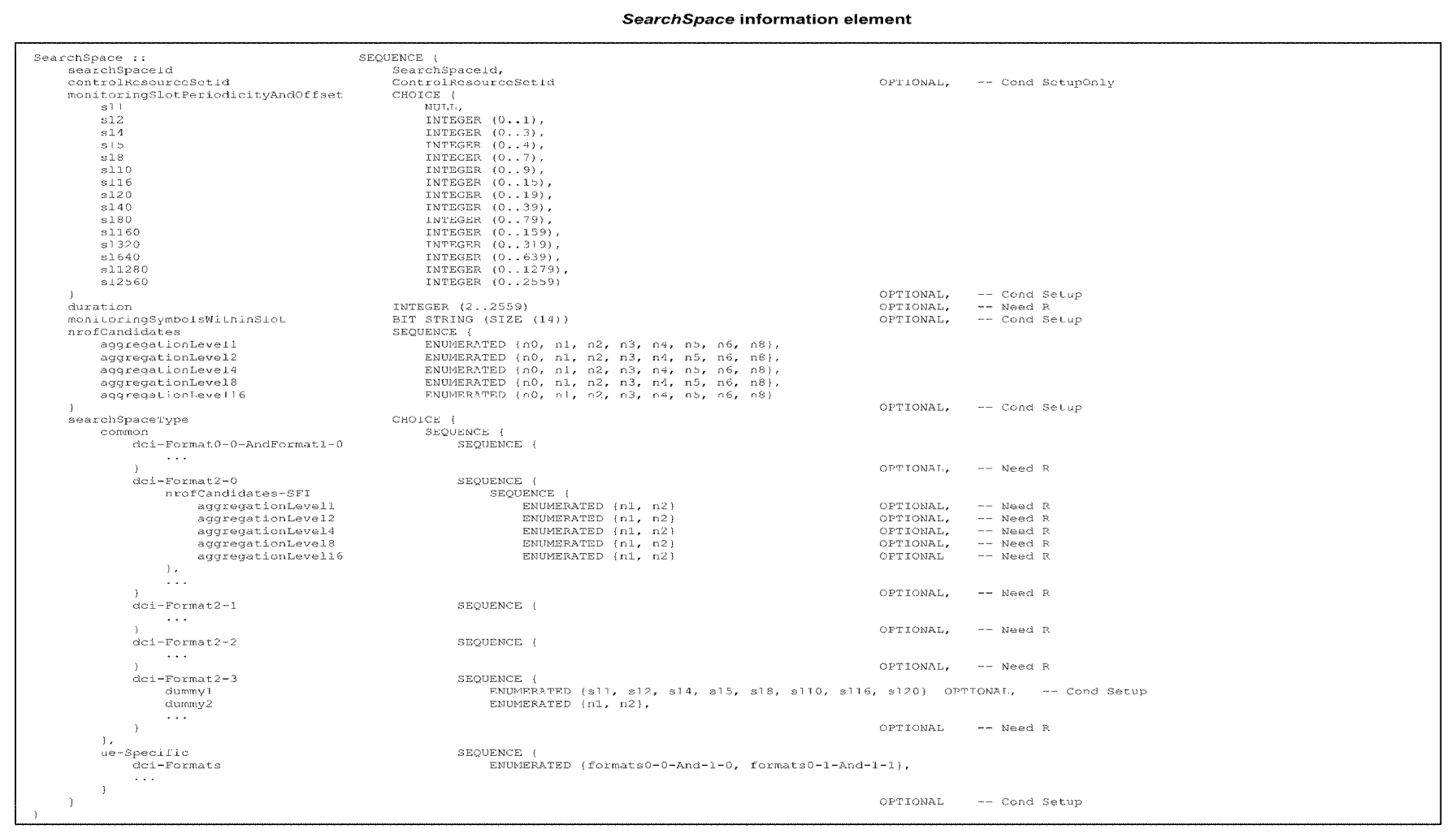

SearchSpace information element

```
SearchSpace ::=                     SEQUENCE {
    searchSpaceId                       SearchSpaceId,
    controlResourceSetId                ControlResourceSetId                                            OPTIONAL,    -- Cond SetupOnly
    monitoringSlotPeriodicityAndOffset  CHOICE {
        sl1                                 NULL,
        sl2                                 INTEGER (0..1),
        sl4                                 INTEGER (0..3),
        sl5                                 INTEGER (0..4),
        sl8                                 INTEGER (0..7),
        sl10                                INTEGER (0..9),
        sl16                                INTEGER (0..15),
        sl20                                INTEGER (0..19),
        sl40                                INTEGER (0..39),
        sl80                                INTEGER (0..79),
        sl160                               INTEGER (0..159),
        sl320                               INTEGER (0..319),
        sl640                               INTEGER (0..639),
        sl1280                              INTEGER (0..1279),
        sl2560                              INTEGER (0..2559)
    }
    duration                            INTEGER (2..2559)                                               OPTIONAL,    -- Need R
    monitoringSymbolsWithinSlot         BIT STRING (SIZE (14))                                          OPTIONAL,    -- Cond Setup
    nrofCandidates                      SEQUENCE {
        aggregationLevel1                   ENUMERATED {n0, n1, n2, n3, n4, n5, n6, n8},
        aggregationLevel2                   ENUMERATED {n0, n1, n2, n3, n4, n5, n6, n8},
        aggregationLevel4                   ENUMERATED {n0, n1, n2, n3, n4, n5, n6, n8},
        aggregationLevel8                   ENUMERATED {n0, n1, n2, n3, n4, n5, n6, n8},
        aggregationLevel16                  ENUMERATED {n0, n1, n2, n3, n4, n5, n6, n8}
    }
    searchSpaceType                     CHOICE {
        common                              SEQUENCE {
            dci-Format0-0-AndFormat1-0          SEQUENCE {
                                                                                                        OPTIONAL,    -- Need R
            }
            dci-Format2-0                       SEQUENCE {
                nrofCandidates-SFI                  SEQUENCE {
                    aggregationLevel1                   ENUMERATED {n1, n2}                             OPTIONAL,    -- Need R
                    aggregationLevel2                   ENUMERATED {n1, n2}                             OPTIONAL,    -- Need R
                    aggregationLevel4                   ENUMERATED {n1, n2}                             OPTIONAL,    -- Need R
                    aggregationLevel8                   ENUMERATED {n1, n2}                             OPTIONAL,    -- Need R
                    aggregationLevel16                  ENUMERATED {n1, n2}                             OPTIONAL,    -- Need R
                },
                ...
            }
            dci-Format2-1                       SEQUENCE {
                                                                                                        OPTIONAL,    -- Need R
            }
            dci-Format2-2                       SEQUENCE {
                                                                                                        OPTIONAL,    -- Need R
            }
            dci-Format2-3                       SEQUENCE {
                dummy1                              ENUMERATED {sl1, sl2, sl4, sl5, sl8, sl10, sl16, sl20} OPTIONAL, -- Cond Setup
                dummy2                              ENUMERATED {n1, n2},
                ...
            }
        },
        ue-Specific                         SEQUENCE {
            dci-Formats                         ENUMERATED {formats0-0-And-1-0, formats0-1-And-1-1},
            ...
                                                                                                        OPTIONAL,    -- Cond Setup
        }
    }
}
```

FIG. 9
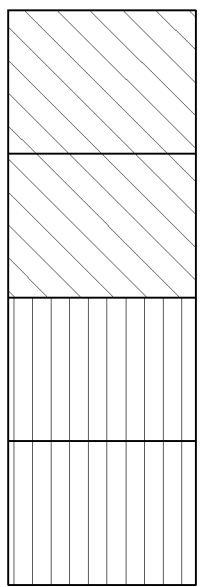
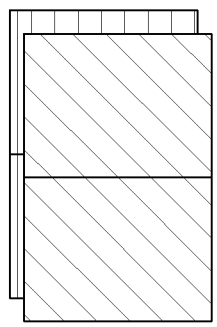
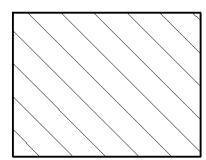 CORESET#0
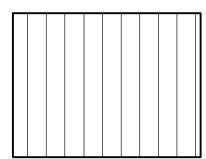 CORESET#1
(A) Resource Allocation    (B) Resource Allocation

METHOD FOR TRANSMITTING AND RECEIVING DOWNLINK CONTROL INFORMATION BETWEEN TERMINAL AND BASE STATION IN WIRELESS COMMUNICATION SYSTEM AND DEVICE FOR SUPPORTING SAME

CROSS-REFERENCE TO RELATED APPLICATIONS

This application is a National Stage application under 35 U.S.C. § 371 of International Application No. PCT/KR2020/000239, filed on Jan. 7, 2020, which claims the benefit of Korean Application No. 10-2019-0003556, filed on Jan. 10, 2019. The disclosures of the prior applications are incorporated by reference in their entirety.

TECHNICAL FIELD

The present disclosure relates to a wireless communication system and, more particularly, to a method of transmitting and receiving downlink control information (DCI) between a terminal and a base station in a wireless communication system and device for supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, the new generation RAT considering eMBB communication, massive MTC, ultra-reliable and low-latency communication (URLLC), etc. have been introduced.

SUMMARY

The object of the present disclosure is to provide a method of transmitting and receiving downlink control information (DCI) between a terminal and a base station in a wireless communication system and devices for supporting the same.

The technical objects that can be achieved through the present disclosure are not limited to what has been particularly described hereinabove and other technical objects not described herein will be more clearly understood by persons skilled in the art from the following detailed description.

The present disclosure provides a method of transmitting and receiving downlink control information between a terminal and a base station in a wireless communication system and devices therefor.

In one aspect of the present disclosure, a method of receiving downlink control information (DCI) by a user equipment (UE) in a wireless communication system is provided. The method may include: receiving, from a base station, configuration information about (i) a configuration of a first control resource set (CORESET) and a configuration of a second CORESET for the UE and (ii) a configuration in which a first physical downlink control channel (PDCCH) candidate in the first CORESET and a second PDCCH candidate in the second CORESET include same DCI; and receiving the DCI through at least one PDCCH candidate of the first PDCCH candidate in the first CORESET or the second PDCCH candidate in the second CORESET based on the configuration information.

According to the present disclosure, one search space including the first CORESET and the second CORESET may be configured for the UE based on the configuration information.

In this case, the UE may expect, based on the configuration information, that the first PDCCH candidate in the first CORESET and the second PDCCH candidate in the second CORESET include the same DCI.

According to the present disclosure, based on that the first CORESET and the second CORESET partially or fully overlap on time and frequency domains, a first demodulation reference signal (DMRS) scrambling identifier (ID) related to the first CORESET may be equal to a second DMRS scrambling ID related to the second CORESET.

According to the present disclosure, based on that the first CORESET and the second CORESET do not overlap on time and frequency domains, a first DMRS scrambling ID related to the first CORESET may be different from a second DMRS scrambling ID related to the second CORESET.

According to the present disclosure, based on the configuration information, (i) a plurality of search spaces may be configured for the UE, and (ii) each of the plurality of search spaces may be configured to include one CORESET.

In this case, the UE may expect, based on the configuration information, that the first PDCCH candidate in the first CORESET in a first search space and the second PDCCH candidate in the second CORESET in a second search space include the same DCI.

According to the present disclosure, a plurality of CORESETs may be related to transmission configuration indicator (TCI) states, respectively, and each of the TCI states may be related to one reference signal (RS) set.

According to the present disclosure, the UE may expect, based on the configuration information, that the first PDCCH candidate in the first CORESET and the second PDCCH candidate in the second CORESET have at least one of a same aggregation level (AL) or a same AL index.

According to the present disclosure, the UE may expect, based on the configuration information, that a total number of control channel elements (CCEs) for CCE index calculation is equal to a sum of a number of CCEs included in the first CORESET and a number of CCEs included in the second CORESET.

According to the present disclosure, the UE may expect, based on the configuration information, that (i) one or more parameters commonly applied to the first CORESET and the second CORESET are commonly configured for the UE and (ii) one or more parameters independently applied to the first CORESET and the second CORESET are independently configured for each CORESET.

In this case, the one or more one or more parameters may include at least one of: (i) period and offset information related to a corresponding CORESET; (ii) location information in a slot related to the corresponding CORESET; or (iii) monitoring duration information in one search space occasion related to the corresponding CORESET.

According to the present disclosure, based on that (i) same period and offset information is configured for the first CORESET and the second CORESET and (ii) different in-slot location information is configured for the first CORESET and the second CORESET based on the configuration information, the UE may expect that the first CORESET and the second CORESET are allocated not to overlap on time and frequency domains and the first CORESET and the second CORESET have a same DMRS scrambling ID.

According to the present disclosure, based on that (i) same period and offset information is configured for the first CORESET and the second CORESET and (ii) same in-slot location information is configured for the first CORESET and the second CORESET based on the configuration information, the UE may expect that the first CORESET and the second CORESET are allocated to partially or fully overlap on time and frequency domains and the first CORESET and the second CORESET have different DMRS scrambling IDs.

According to the present disclosure, the configuration in which the first PDCCH candidate and the second PDCCH candidate include the same DCI may include at least one of (i) a configuration in which the first PDCCH candidate and the second PDCCH candidate include same DCI content or (ii) a configuration in which the first PDCCH candidate and the second PDCCH candidate include a same DCI format.

In another aspect of the present disclosure, a UE configured to receive DCI in a wireless communication system is provided. The UE may include: at least one transmitter; at least one receiver; at least one processor; and at least one memory operably connected to the at least one processor and configured to store instructions that, when executed, cause the at least one processor to perform operations including: receiving, from a base station, configuration information about (i) a configuration of a first CORESET and a configuration of a second CORESET for the UE and (ii) a configuration in which a first PDCCH candidate in the first CORESET and a second PDCCH candidate in the second CORESET include same DCI; and receiving the DCI through at least one PDCCH candidate of the first PDCCH candidate in the first CORESET or the second PDCCH candidate in the second CORESET based on the configuration information.

According to the present disclosure, the UE may be configured to communicate with at least one of a mobile terminal, a network, or an autonomous driving vehicle other than a vehicle including the UE.

In a further aspect of the present disclosure, a base station configured to transmit DCI in a wireless communication system is provided. The base station may include: at least one transmitter; at least one receiver; at least one processor; and at least one memory operably connected to the at least one processor and configured to store instructions that, when executed, cause the at least one processor to perform operations comprising: transmitting, to a UE, configuration information about (i) a configuration of a first CORESET and a configuration of a second CORESET for the UE and (ii) a configuration in which a first PDCCH candidate in the first CORESET and a second PDCCH candidate in the second CORESET include same DCI; and transmitting the DCI through at least one PDCCH candidate of the first PDCCH candidate in the first CORESET or the second PDCCH candidate in the second CORESET based on the configuration information.

It will be understood by those skilled in the art that the above-described aspects of the present disclosure are merely part of the embodiments of the present disclosure and various modifications and alternatives could be developed from the following technical features of the present disclosure.

As is apparent from the above description, the present disclosure have the following effects.

According to the present disclosure, when a base station transmits a plurality of physical downlink control channels (PDCCHs) to a user equipment (UE) based on an ultra-reliability low latency communication (URLLC) mode requiring low latency, the UE may detect the same DCI from a plurality of control resource sets (CORESETs) with high success probability.

The base station may provide DCI for the URLLC mode to the UE through at least one of the plurality of PDCCHs (or CORESETs).

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 6 is a diagram schematically illustrating an example of a front loaded demodulation reference signal (DMRS) of a first DMRS configuration type applicable to the present disclosure.

FIG. 7 is a diagram illustrating a configuration of a higher layer parameter SearchSpace IE applicable to the present disclosure.

FIG. 9 is a diagram illustrating an example of resource allocation for each control resource set (CORESET) applicable to the present disclosure.

FIGS. 11 and 12 are diagram illustrating examples of PDCCH candidates that a UE searches for in CORESET #0/ #1 according to the present disclosure.

DETAILED DESCRIPTION

Figure 1:
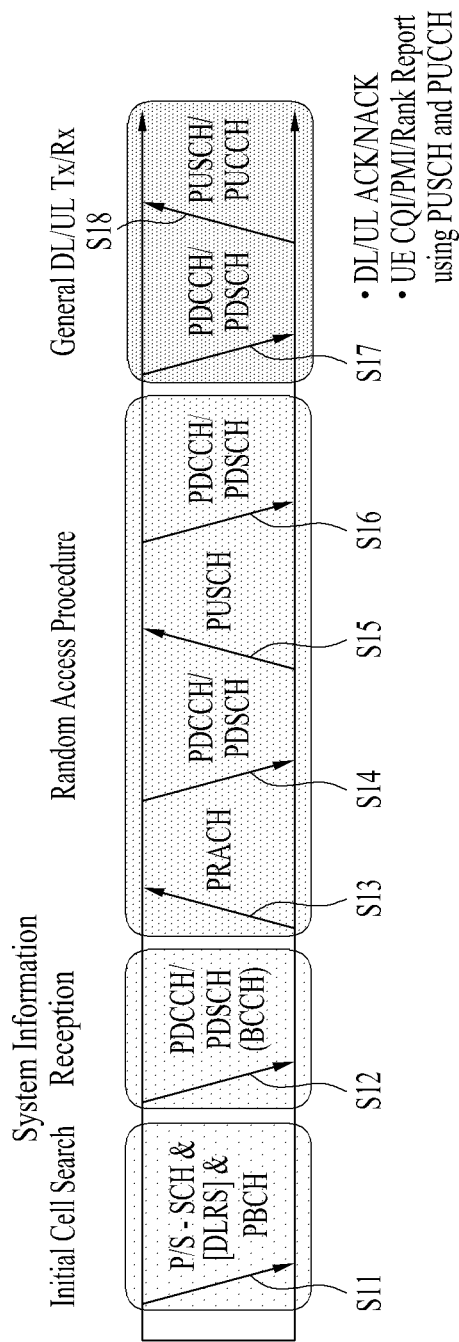
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System

1.1. Physical Channels and General Signal Transmission

In a wireless access system, a UE receives information from a BS on DL and transmits information to the BS on UL.

The information transmitted and received between the UE and the BS includes general data information and various types of control information. There are many physical channels according to the types/usages of information transmitted and received between the BS and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
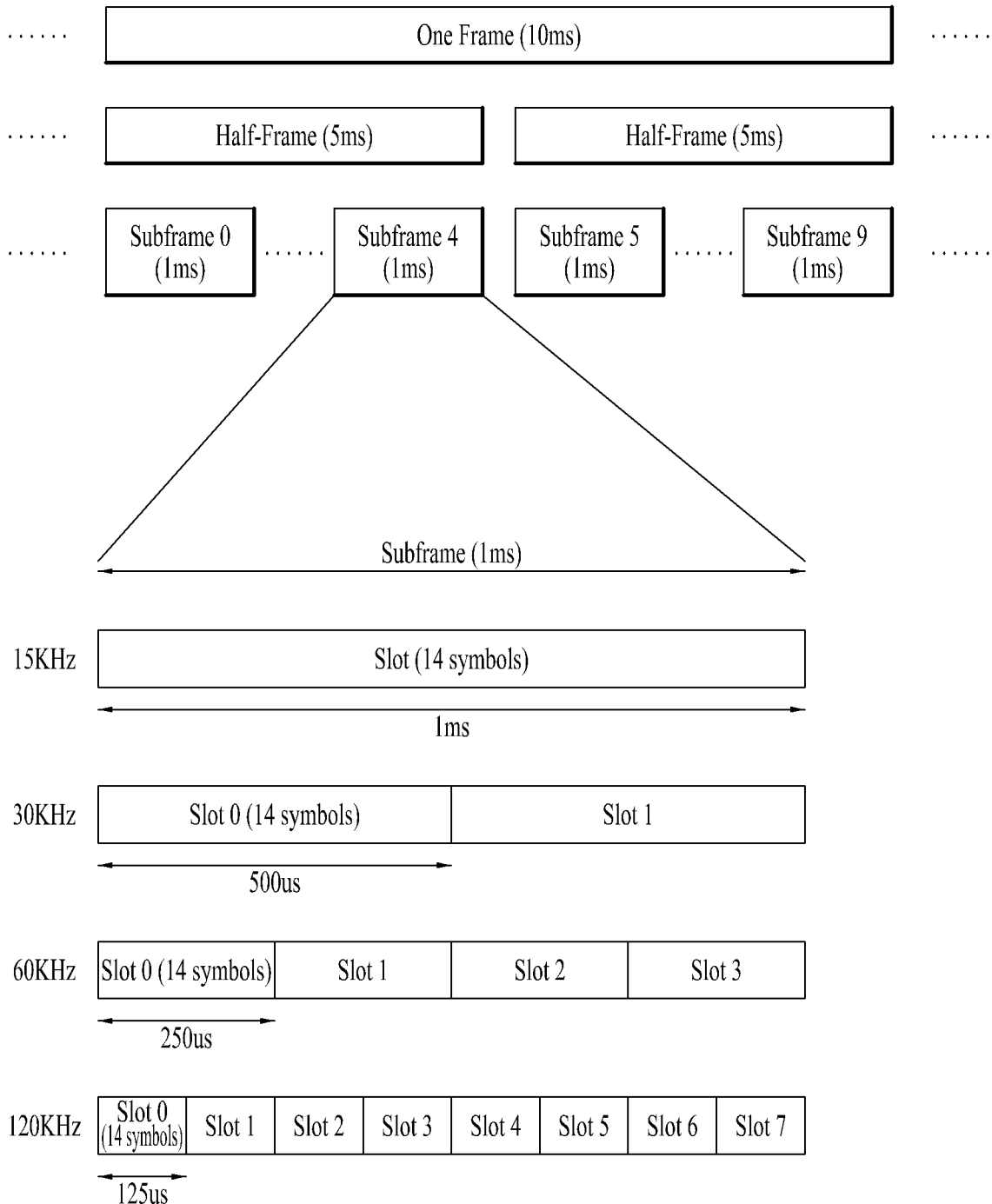
FIG. 2 is a diagram illustrating a radio frame structure in a new radio (NR) system to which embodiments of the present disclosure are applicable.

FIG. 2 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM (A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM (A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

NR supports multiple numerologies (e.g., subcarrier spacings (SCSs)) to support various 5th generation (5G) services. For example, the NR system supports a wide area in conventional cellular bands for an SCS of 15 kHz, a dense urban environment, low latency, and a wide carrier bandwidth for an SCS of 30/60 kHz, and a bandwidth wider than 24.25 GHz to overcome phase noise, for an SCS of 60 kHz or above.

An NR frequency band is defined by two types of frequency ranges, FR1 and FR2. FR1 and FR2 may be configured as described in Table 3 below. FR2 may represent millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 3:
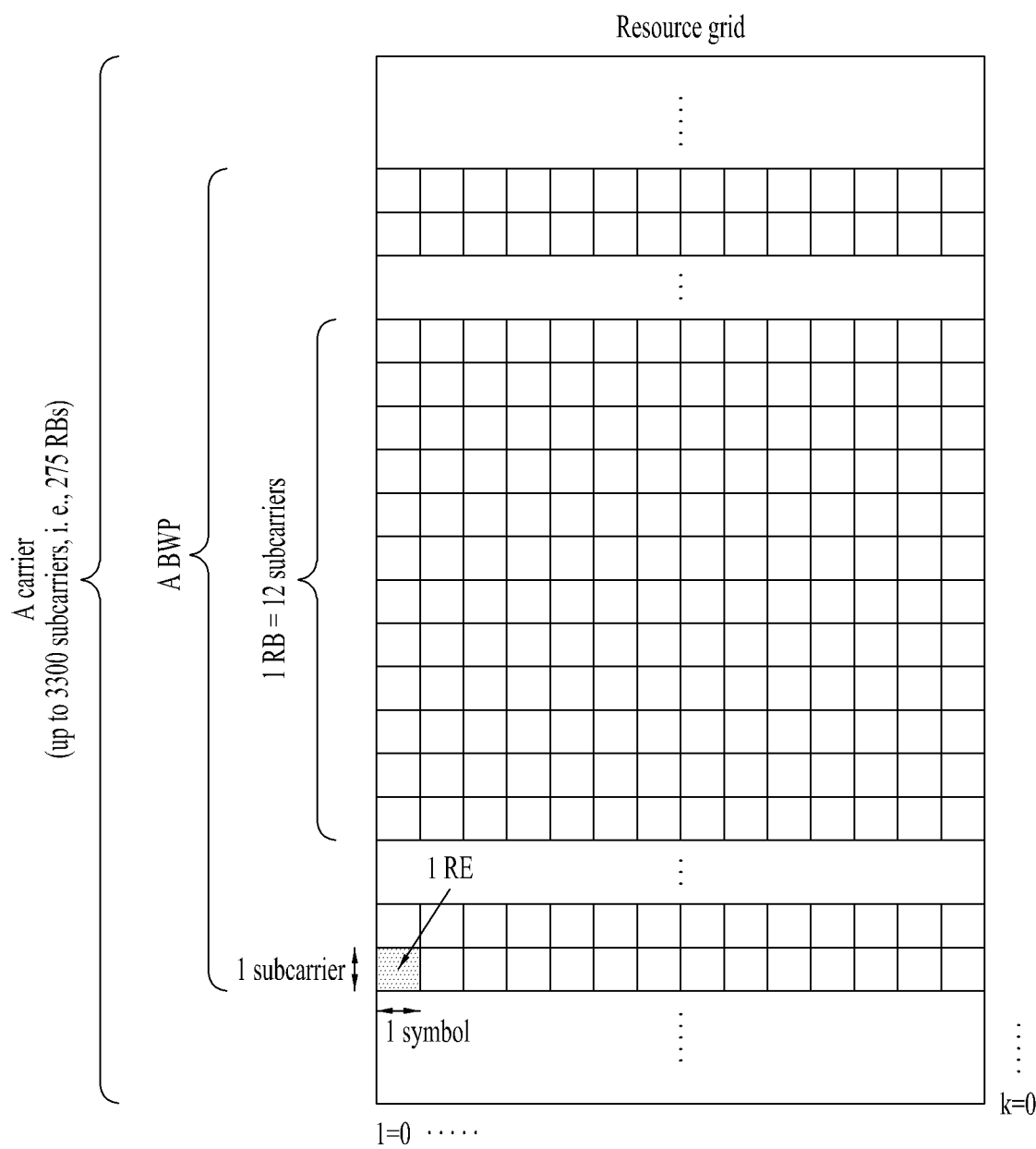
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P) RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
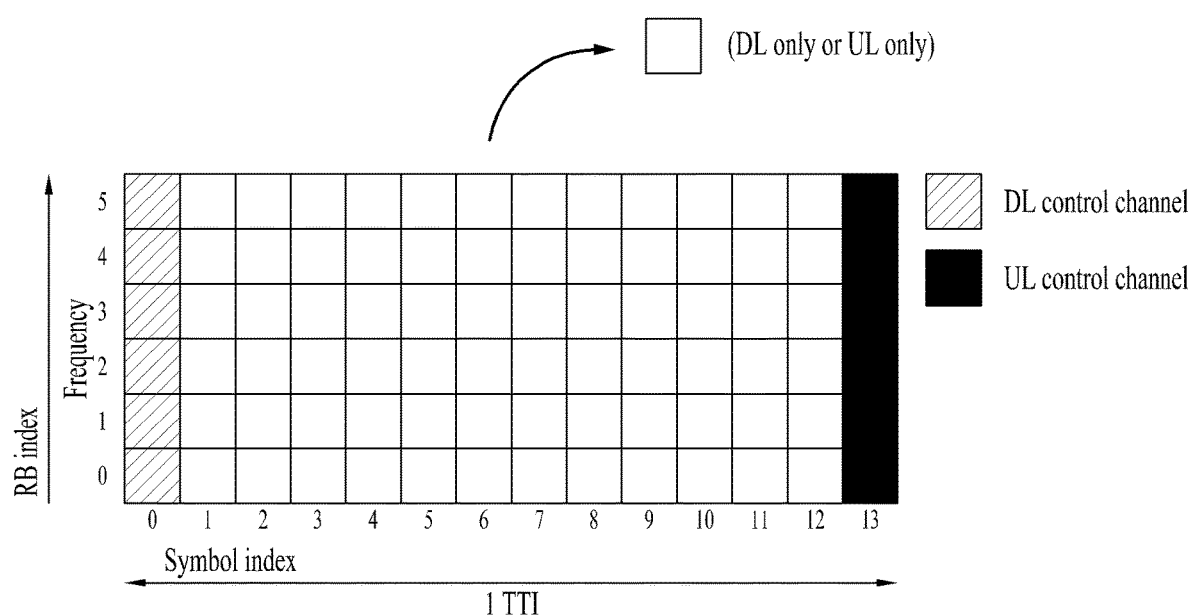
FIG. 4 is a diagram illustrating a self-contained slot structure in an NR system to which embodiments of the present disclosure are applicable.

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and UE to switch from transmission mode to reception mode and vice versa. To this end, in the self-contained slot structure, some OFDM symbols at the time of switching from DL to UL may be configured as a guard period (GP).

Figure 5:
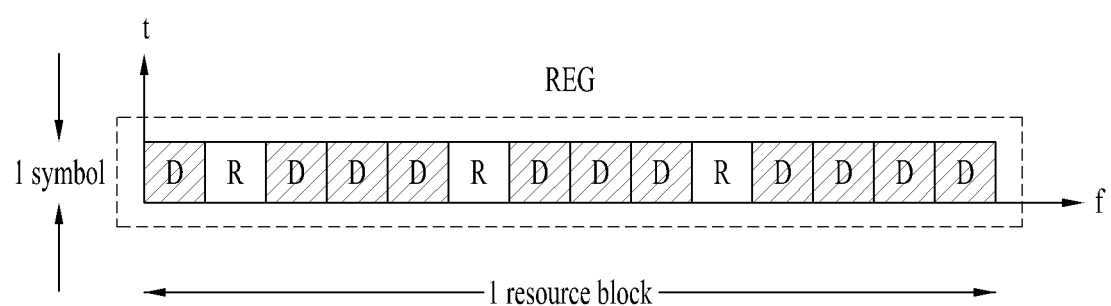
FIG. 5 is a diagram illustrating the structure of one REG in an NR system to which embodiments of the present disclosure are applicable.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 5.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 includes an MCS/new data indicator (NDI)/redundancy version (RV) field for transport block (TB) 1. Only when a higher-layer parameter maxNrofCodeWordsScheduledByDCI in a higher-layer parameter PDSCH-Config is set to n2 (i.e., 2), DCI format 1_1 may further include an MCS/NDI/RV field for TB 2.

Particularly, when the higher-layer parameter maxNrofCodeWordsScheduledByDCI is set to n2 (i.e., 2), it may be determined based on a combination of the MCS field and the RV field whether a TB is actually enabled or disabled. More specifically, when the MCS field is set to 26 and the RV field is set to 1 for a specific TB, the TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.4. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In the present disclosure, the higher layer parameter ControlResourceSet IE may be configured as shown in Table 5 below.

TABLE 5

ControlResourceSet information element

```
-- ASN1START
-- TAG-CONTROLRESOURCESET-START
ControlResourceSet ::=      SEQUENCE {
controlResourceSetId        ControlResourceSetId,
frequencyDomainResources        BIT STRING (SIZE (45)),
duration            INTEGER (1..maxCoReSetDuration),
cce-REG-MappingType         CHOICE {
interleaved         SEQUENCE {
reg-BundleSize          ENUMERATED {n2, n3, n6},
interleaverSize         ENUMERATED {n2, n3, n6},
shiftIndex          INTEGER(0..maxNrofPhysicalResourceBlocks-1) OPTIONAL -- Need S
},
nonInterleaved          NULL
},
```

TABLE 5-continued

ControlResourceSet information element

```
precoderGranularity          ENUMERATED {sameAsREG-bundle, allContiguousRBs},
tci-StatesPDCCH-ToAddList             SEQUENCE(SIZE    (1..maxNrofTCI-StatesPDCCH)) OF TCI-StateId
OPTIONAL, -- Cond NotSIB1-initialBWP
tci-StatesPDCCH-ToReleaseList         SEQUENCE(SIZE    (1..maxNrofTCI-StatesPDCCH)) OF TCI-StateId
OPTIONAL, -- Cond NotSIB1-initialBWP
tci-PresentInDCI            ENUMERATED {enabled}       OPTIONAL, -- Need S
pdcch-DMRS-ScramblingID           INTEGER (0..65535)      OPTIONAL, -- Need S
...
}
-- TAG-CONTROLRESOURCESET-STOP
-- ASN1STOP
```

The parameters defined in Table 5 may be the same as the parameters defined in 3GPP TS 38.331.

In addition, configuration information for CORESET 0 (e.g., common CORESET) may be configured by a higher layer parameter ControlResourceSetZero IE.

1.5. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot}$+1). In this case, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDCI is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold Threshold-Sched-Offset.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
- 'QCL-TypeC' with an SS/PBCH block and, when (QCL-TypeD) is applicable, 'QCL-TypeD' with the same SS/PBCH block, or
- 'QCL-TypeC' with an SS/PBCH block and, when (QCL-TypeD) is applicable, 'QCL-TypeD' with a periodic CSI-RS resource in a higher layer parameter NZP-CSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or
- 'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition, or
- 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or
- 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

In the present disclosure, QCL signaling may include all signaling configurations listed in the following table.

TABLE 6

| QCL linkage for FR2 after RRC | signalling |
|---|---|
| SSB → TRS w.r.t. average delay, Doppler shift, spatial RX parameters | QCL type: C + D |
| TRS → CSI-RS for BM w.r.t. average delay, Doppler shift delay spread, Doppler spread estimation | QCL type: A + D |
| TRS → CSI-RS for CSI w.r.t. average delay, Doppler shift, delay spread, Doppler spread estimation | QCL type: A |

TABLE 6-continued

| QCL linkage for FR2 after RRC | signalling |
|---|---|
| TRS → DMRS for PDCCH w.r.t. average delay, Doppler shift, delay spread, Doppler spread estimation | QCL type: A + D |
| TRS → DMRS for PDSCH w.r.t. average delay, Doppler shift, delay spread, Doppler spread estimation | QCL type: A + D |
| SSB → CSI-RS for BM w.r.t. average delay, Doppler shift, spatial RX parameters | QCL type: C + D |
| SSB → CSI-RS for CSI w.r.t., spatial RX parameters | QCL type: D |
| SSB → DMRS for RDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t., spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type: A + D |
| CSI-RS for BM → CSI-RS for TRS/BM/CSI w.r.t. spatial RX parameters | QCL type: D |

In the following tables, if one row in the tables below has the same RS type, it is assumed that the same RS ID may be applied for the row.

In the present disclosure, when a CSI-RS resource is included in the higher layer parameter NZP-CSI-RS-ResourceSet in which the higher layer parameter trs-Info is configured, the UE expects the following two possible configurations for a higher layer parameter TCI-state.

TABLE 7

| Valid TCI state Configuration | DL RS 1 | qcl-Type 1 | DL RS 2 (if configured) | qcl-Type2 (if configured) |
|---|---|---|---|---|
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 7, * represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter trs-Info and the higher layer parameter repetition are not configured, the UE expects the following three possible configurations for the higher layer parameter TCI-state.

TABLE 8

| Valid TCI state Configuration | DL RS 1 | qcl-Type1 | DL RS 2 (if configured) | qcl-Type2 (if configured) |
|---|---|---|---|---|
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4* | TRS | QCL-TypeB | | |

In Table 8, * represents a case in which QCL type-D is not applicable.

In Table 8, ** represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter repetition is configured, the UE expects the following three possible configurations for the higher layer parameter TCI-state.

TABLE 9

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

In Tables 10 and 11 below, if QCL type-D is applicable, DL RS 2 and QLC type-2 need to be configured for the UE except a default case (e.g., the fourth row in Tables 10 and 11). When a TRS for DL is used for QCL type-D, the TRS is a source RS for QCL type-D and thus needs to have an SS/PBCH block or CSI-RS.

For a PDCCH DMRS, the UE expects the following three possible configurations for the higher layer parameter TCI-state. The fourth configuration is a default configuration and valid before the TRS is configured.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 10, * represents a configuration that can be applied before the TRS is configured. In this case, the configuration may be a valid QCL assumption rather than a TCI state.

In Table 10, ** represents that QCL parameters may not be directly derived from CSI-RS(s) (CSI).

For the PDCCH DMRS, the UE may expect only the following three available configurations of the higher-layer parameter TCI-State, while the fourth configuration (in the fourth row in the following two tables) is valid by default, before a TRS is configured.

TABLE 11

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 11, * represents a configuration that can be applied before the TRS is configured. In this case, the configuration may be a valid QCL assumption rather than a TCI state.

In Table 11, ** represents that QCL parameters may not be directly derived from CSI-RS(s) (CSI).

For the PDCCH DMRS, the UE may expect only the following three available configurations of the higher-layer parameter TCI-State, while the fourth configuration (in the fourth row in the following two tables) is valid by default, before a TRS is configured.

TABLE 12

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 12, * represents a configuration that can be applied before the TRS is configured. In this case, the configuration may correspond to a valid QCL assumption rather than a TCI state.

In Table 12, ** represents that QCL parameters may not be directly derived from CSI-RS(s) (CSI).

In the present disclosure, the BS may configure a TCI state for a CORESET to the UE through the following medium access control (MAC) control element (CE). The UE may determine an Rx beam to receive the corresponding CORESET based on the TCI state.

TABLE 13

| Serving Cell ID | CORESET ID | Oct 1 |
|---|---|---|
| CORE SET ID | TCI State ID | Oct 2 |

For example, the BS may provide TCI state indication information to the UE through a UE-specific PDCCH MAC-CE configured as shown in Table 13. The TCI state indication may be identified by a MAC subheader with a logical channel ID (LCID). The TCI state indication may have a fixed size of 16 bits including the following fields.

Serving Cell ID: This field indicates the identifier (or identify) of a serving cell to which the MAC CE is applied. The length of the field is 5 bits.

CORESET ID: This field indicates a CORESET identified with the higher layer parameter ControlResourceSetId, for which a TCI state is indicated. If the value of the field is 0, the field may indicate a CORESET configured by the higher layer parameter controlResourceSetZero. The length of the field is 4 bits.

TCI State ID: This field indicates a TCI state identified by the higher layer parameter TCI-StateId applicable to a CORESET identified by the CORESET ID field. If the CORESET ID field is set to 0, this field indicates TCI-StateId for a TCI state of the first 64 TCI-states configured by the higher layer parameters tci-States-ToAddModList and tci-States-ToReleaseList included in PDSCH-Config in an active BWP. If the CORESET ID field is set to other values except 0, this field indicates TCI-StateId configured by the higher layer parameters tci-StatesPDCCH-ToAddList and tci-StatesPDCCH-ToReleaseList included in controlResourceSet identified by the indicated CORESET ID. The length of the field is 7 bits.

1.6. Channel State Information Reference Signal (CSI-RS)

A mobile communication system according to the present disclosure uses a method for increasing data transmission/reception efficiency by adopting multiple transmission antennas and multiple reception antennas for packet transmission. When data is transmitted/received through multiple input/output antennas, channel states between the transmission antennas and the reception antennas should be detected to accurately receive the signal. Therefore, each transmission antenna may have an individual RS. An RS for CSI feedback may be defined as a CSI-RS.

The CSI-RS includes zero power (ZP) CSI-RS and non-zero power (NZP) CSI-RS. The ZP CSI-RS and the NZP CSI-RS may be defined as follows.

The NZP CSI-RS may be configured by an NZP-CSI-RS-Resource information element (IE) or a CSI-RS-Resource-Mobility field in a CSI-RS-ResourceConfigMobility IE. The NZP CSI-RS may be defined based on the sequence generation and resource mapping method defined in 3GPP TS 38.211.

The ZP CSI-RS may be configured by a ZP-CSI-RS-Resource IE. The UE may assume that resources configured for the ZP CSI-RS are not used for PDSCH transmission. The UE performs the same measurement/reception on channels/signals except PDSCHs regardless of whether they collide with the ZP CSI-RS or not Positions at which the CSI-RS is mapped in a slot may be dynamically determined by the number of CSI-RS ports, a CSI-RS density, a code division multiplexing (CDM) type, and a higher-layer parameter (e.g., firstOFDMSymbolInTimeDomain, firstOFDMSymbolInTimeDomain2, and so on).

1.7. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1-2) or fourth (e.g., l=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

In the present disclosure, two DMRS configuration types may be applied. Among of the two DMRS configuration types, a DMRS configuration type that is actually configured for a UE may be indicated by higher layer signaling (e.g., RRC signaling).

DMRS configuration type 1 may be subdivided as follows depending on the number of OFDM symbols allocated for the front-loaded DMRS.

DMRS Configuration Type 1 and Number of OFDM Symbols to which the Front-Loaded DMRS is Allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS Configuration Type 1 and Number of OFDM Symbols to which the Front-Loaded DMRS is Allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [1_1]. RS density may be set to 12 REs per port in the RB.

DMRS configuration type 2 may be classified as follows according to the number of OFDM symbols to which the front-loaded DMRS is allocated.

DMRS Configuration Type 2 and Number of OFDM Symbols to which the Front-Loaded DMRS is Allocated=1

Up to 6 ports (e.g., P0 to P5) may be multiplexed based on length-2 F-CDM and FDM schemes. RS density may be set to 4 REs per port in the RB.

DMRS Configuration Type 2 and Number of OFDM Symbols to which the Front-Loaded DMRS is Allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1_1]. RS density may be set to 8 REs per port in the RB.

FIG. 6 is a diagram schematically illustrating an example of a front loaded DMRS of a first DMRS configuration type applicable to the present disclosure.

More specifically, FIG. 6(a) illustrates a front-loaded DMRS with one symbol and FIG. 6(b) illustrates a front-loaded DMRS with two symbols.

In FIG. 6, $\Delta$ represents a DMRS offset value on the frequency axis. In this case, DMRS ports having the same DMRS offset $\Delta$ may be subjected to code division multiplexing in the frequency domain (CDM-F) or code division multiplexing in the time domain (CDM-T). In addition, DMRS ports having different DMRS offsets $\Delta$ may be subjected to CDM-F.

According to the present disclosure, CDM-F may be applied based on $w_f(k')$ of the following table, and CDM-T may be applied based on $w_t(l')$ of the following table. k' and l' are parameters that determine the index of a subcarrier to which the DMRS is mapped, which may have a value 0 or 1. DMRSs corresponding to respective DMRS ports may be grouped into CDM groups listed in the following table.

Table 14 lists parameters for a first DMRS configuration type for the PDSCH, and Table 15 lists parameters for a second DMRS configuration type for the PDSCH.

TABLE 14

| p | CDM group $\lambda$ | $\Delta$ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 15

| p | CDM group $\lambda$ | $\Delta$ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The UE may obtain DMRS port configuration information configured by the BS from DCI. For example, the UE may obtain the DMRS port configuration information from an antenna ports field of DCI format 1_1 based on a DMRS configuration type configured for the UE (e.g., a first DMRS configuration type (dmrs-Type=1) or a second DMRS configuration type (dmrs-Type=2)), and the maximum number of OFDM symbols for a DL front loaded DMRS (e.g., maxLength=1 or maxLength=2). More specifically, Table 16 illustrates DMRS port configuration information according to the value of the antenna ports field, when (dmrs-Type=1 and maxLength=1) is configured for the UE, and Table 17 illustrates DMRS port configuration information according to the value of the antenna ports field, when (dmrs-Type=1 and maxLength=2) is configured for the UE. Table 18 illustrates DMRS port configuration information according to the value of the antenna ports field, when (dmrs-Type=2 and maxLength=1) is configured for the UE, and Table 19 illustrates DMRS port configuration information according to the value of the antenna ports field, when (dmrs-Type=2 and maxLength=2) is configured for the UE.

TABLE 16

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 18

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |

TABLE 17

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-toad symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 18-continued

| One codeword: Codeword 0 enabled, Codeword 1 disabled | | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 19

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM groups(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |

TABLE 19-continued

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM groups(s) without data | DMRS port(s) | Number of front-load symbols | Value | Number of DMRS CDM group(s) without data | DMRS port(s) | Number of front-load symbols |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

The UE may receive the DMRS according to a condition as follows.

For DMRS configuration type 1,
when one codeword is scheduled for the UE, and DCI indicating one of {2, 9, 10, 11, 30} as an index related to antenna port mapping (e.g., an index in Table 14 or Table 15) is allocated to the UE, or when two codewords are scheduled for the UE,
the UE may receive the DMRS on the assumption that none of the remaining orthogonal antenna ports are associated with a PDSCH transmission to another UE.

For DMRS configuration type 2,
when one codeword is scheduled for the UE, and DCI indicating one of {2, 10, 23} as an index related to antenna port mapping (e.g., an index in Table 14 or Table 15) is allocated to the UE, or when two codewords are scheduled for the UE,
the UE may receive the DMRS on the assumption that none of the remaining orthogonal antenna ports are associated with a PDSCH transmission to another UE.

1.8. Codeword

In the present disclosure, the BS may configure the maximum number of codewords scheduled by one DCI for the UE by higher-layer signaling. For example, the BS may set the maximum number of codewords scheduled by one DCI to 1 or 2 for the UE based on the higher-layer parameter maxNrofCodeWordsScheduledByDCI (having a value n1 or n2). The higher-layer parameter maxNrofCodeWordsScheduledByDCI may be included in the higher-layer parameter PDSCH-Config.

Referring to Rel-15 TS 38.212, DCI format 1_1 may be configured as described in the following table according to the higher-layer parameter maxNrofCodeWordsScheduledByDCI.

TABLE 20

For transport block 1:
Modulation and coding scheme—5 bits
New data indicator—1 bit
Redundancy version—2 bits
For transport block 2 (only present if maxNrofCodeWords-ScheduledByDCI equals 2):
Modulation and coding scheme—5 bits
New data indicator—1 bit
Redundancy version—2 bits Therefore, the NDI, MCS, and RV of CW #0 may be configured/indicated based on the NDI, MCS, and RV for TB 1 in the DCI. Likewise, the NDI, MCS, and RV of CW #1 may be configured/indicated based on the NDI, MCS, and RV for TB 2 in the DCI.

Additionally, when (i) a bandwidth part indicator field indicates a bandwidth part other than an active bandwidth part, (ii) the higher-layer parameter maxNrofCodeWordsScheduledByDCI for the indicated bandwidth part is set to 2, and (iii) the higher-layer parameter maxNrofCodeWordsScheduledByDCI for the active bandwidth part is set to 1, the UE may assume that the MCS, NDI, and RV fields of TB 2 are zero-padded in interpreting the MCS, NDI, and RV fields of TB 2. In this case, the UE may ignore the MCS, NDI, and RV fields of TB 2 for the indicated bandwidth part.

Further, when the higher-layer parameter maxNrofCodeWordsScheduledByDCI indicates that a 2-codeword transmission is enabled, one of two TBs (or codewords) may be enabled or disabled in the following method.

More specifically, when the higher-layer parameter maxNrofCodeWordsScheduledByDCI indicates that a 2-codeword transmission is enabled, one of the two TBs may be disabled, when for a RB corresponding to DCI format 1_1, (i) the MCS value is 26 (i.e., IMCS=26) and (ii) the RV value is 1 (i.e., rvid=1). When both of the TBs are enabled, TB 1 and TB 2 may be mapped to codeword 0 and codeword 1, respectively. When only one TB is enabled, the active TB may always be mapped to the first codeword (i.e., codeword 0).

1.9. Search Space

FIG. 7 is a diagram illustrating the configuration of the higher layer parameter SearchSpace IE applicable to the present disclosure.

The BS may configure one or more search spaces associated with a CORESET to the UE by transmitting the SearchSpace IE to the UE through RRC signaling as shown in FIG. 7. In this case, if controlResourceSetID is defined in the SearchSpace IE, one search space may be associated with one CORESET.

The SearchSpace IE defines how/where the UE searches for PDCCH candidate(s). Each search space is associated with one ControlResourceSet. For a scheduled cell in cross carrier scheduling, all optional fields may be absent except for nrofCandidates.

In the SearchSpace IE, each field may be defined as shown in the following tables.

TABLE 21 common

Configures this search space as common search space (CSS) and DCI formats to monitor.
controlResourceSetId The CORESET applicable for this SearchSpace. Value 0 identifies the common CORESET#0 configured in MIB and in ServingCellConfigCommon. Values 1..maxNrofControlResourceSets-1 identify CORESETs configured in System Information or by dedicated signalling. The CORESETs with non-zero controResourceSetId locate in the same BWP as this SearchSpace.
dummy1, dummy2

This field is not used in the specificaton. If received it shall be ignored by the UE.
dci-Format0-0-AndFormat1-0

If configured, the UE monitors the DCI formats 0_0 and 1_0 according to TS 38.213, clause 10.1.
dci-Format2-0

If configured, UE monitors the DCI format 2_0 according to TS 38.213, clause 10.1.11.1.1.
dci-Format2-1

If configured, UE monitors the DCI format 2_1 according to TS 38.213, clause 10.1.11.2.
dci-Format2-2

If configured, UE monitors the DCI format 2_2 according to TS 38.213, clause 10.1.11.3.
dci-Format2-3

If configured, UE monitors the DCI format 2_3 according to TS 38.213, clause 10.1.11.4
dci-Formats Indicates whether the UE monitors in this USS for DCI formats 0-0 and 1-0 or for formats 0-1 and 1-1.

TABLE 22 duration

Number of consecutive slots that a SearchSpace lasts in every occasion, i.e., upon every period as given in the periodicityAndOffset. If the field is absent, the UE applies the value 1 slot, except for DCI format 2_0. The UE ignores this field for DCI format 2_0. The maximum valid duration is periodicity-1 (periodicity as given in the monitoringSlotPeriodicityAndOffset).
monitoringSlotPeriodicityAndOffset Slots for PDCCH Monitoring configured as periodicity and offset. If the UE is configured to monitor DCI format 2_1, only the values 'sl1', 'sl2' or 'sl4' are applicable. If the UE is configured, to monitor DCI format 2_0, only the values 'sl1', 'sl2', 'sl4', 'sl5', 'sl8', 'sl10', 'sl16', and 'sl20' are applicable (see TS 38.213, clause 10).
monitoringSymbolsWithinSlot The first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second CFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE. For DCI format 2_0, the first one symbol applies if the duration of CORESET (in the IE ControlResourceSet) identified by controlResourceSetId indicates 3 symbols, the first two symbols apply if the duration of CORESET identified by controlResourceSetId indicates 2 symbols, and the first three symbols apply

TABLE 22-continued if the duration of CORESET identified by controlResourceSetId indicates 1 symbol. See TS 38.213, clause 10.
nrofCandidates-SFI The number of PDCCH candidates specifically for format 2-0 for the configured aggregation level. If an aggregation level is absent, the UE does not search for any candidates with that aggregation level. The network configures only one aggregationLevel and the corresponding number of candidates (see TS 38.213: clause 11.1.11).

TABLE 23 nrofCandidates

Number of PDCCH candidates per aggregation level. The number of candidates and aggregation levels configured here applies to all formats unless a particular value is specified or a format-specific value is provided (see inside searchSpaceType). If configured in the SearchSpace of a cross carrier scheduled cell, this field determines the number of candidates and aggregation levels to be used on the linked scheduling cell (see TS 38.213. clause 10).
searchSpaceId Identity of the search space. SearchSpaceId = 0 identifies the searchSpaceZero configured via PBCH (MIB) or ServingCellConfigCommon and may hence not be used in the SearchSpace IE The searchSpacId is unique among the BWPs of a Serving Cell. In case of cross carrier scheduling, search spaces with the same searchSpaceId in scheduled cell and scheduling cell are linked to each other. The UE applies the search space for the scheduled cell only if the DLBWPs in which the linked search spaces are configured in scheduling cell and scheduled cell are both active.
searchSpace Type Indicates whether this is a common search space (present) or a UE specific search space as well as DCI formats to monitor for.
ue-Specific Configures this search space as UE specific search space (USS). The UE monitors the DCI format with CRC scrambled by C-RNTI, CS-RNTI (if configured), and SP-CSI-RNTI (if configured)

The conditional phrase disclosed in the SearchSpace IE may be interpreted as follows.

TABLE 24

| Conditional Presence | Explanation |
|---|---|
| Setup | This field is mandatory present upon creation of a new SearchSpace. It is optionally present. Need M, otherwise. |
| SetupOnly | This field is mandatory present upon creation of a new SearchSpace. It is absent. Need M, otherwise. |

In the present disclosure, the UE may use a hashing function to calculate a CCE index in a search space set. In this case, the hashing function may be configured based on Table 25 below. In other words, the UE may calculate the CCE index from the search space set based on the following hashing function.

TABLE 25

Hashing function

For a search space set s associated with control resource set p, the CCE indexes for aggregation level L corresponding to PDCCH candidate $m_{s,n_{CI}}$ of the search space set in slot $n_{s,f}^\mu$ for a serving cell corresponding to carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i$$

where
For any common search space, $Y_{p,n_{s,f}^\mu} = 0$;
For a UE-specific search space, $Y_{p,n_{s,f}^\mu} = (A_p \cdot Y_{p,n_{s,f}^\mu-1}) \bmod D$, $Y_{p,-1} = n_{RNTI} \neq 0$, $A_p = 39827$ for pmod3 = 0, $A_p = 39829$ for pmod3 = 1, $A_p = 39839$ for pmod3 = 2, and D = 65537; i = 0, . . . , L − 1;
$m_{s,n_{CI}} = 0, \ldots, M_{p,s,n_{CI}}^{(L)} - 1$, where $M_{p,s,n_{CI}}^{(L)}$ is the number of PDCCH candidate the UE is configured to monitor for aggregation level L for a serving cell corresponding to $n_{CI}$ and a search space set s;
For any common search space, $M_{p,s,max}^{(L)} = M_{p,s,0}^{(L)}$;
For a UE-specific search space, $M_{p,s,max}^{(L)}$ is the maximum of $M_{p,s,n_{CI}}^{(L)}$ over all configured $n_{CI}$ values for a CCE aggregation level L of search space set s in control resource set p; the RNTI value used for $n_{RNTI}$ is the C-RNTI.

2. Operation Examples of UE and BS Disclosed in This Document

In a wireless communication system to which the present disclosure is applicable, it may be required that the packet error probability of ultra-reliable low latency commination (URLLC) satisfies $10^{-5}$ or less. Accordingly, it may also be required that the error probability for a control channel satisfies $10^{-5}$ or less.

In the wireless communication system to which the present disclosure is applicable, one UE may receive the same DCI from a plurality of transmission reception points (TRPs) on a plurality of Rx beams simultaneously or sequentially. Thus, the DCI decoding success probability of the UE may be improved.

2.1. First Operation Example

When a plurality of CORESETs in one search space are configured by the BS, the UE may expect that a set of PDCCH candidates defined for each of the plurality of CORESETs includes the same DCI by a unit of a CORESET (by a CORESET-wise manner).

In this document, the same DCI by CORESET-wise may mean that any PDCCH candidates defined for each of two CORESETs include the same DCI content and/or the same DCI format. Hereinafter, for convenience of description, it is assumed that the same DCI means the same DCI information and/or the same DCI format. For example, PDCCH candidate #5 of CORESET #0 and PDCCH candidate #5 of CORESET #1 may include the same DCI.

In this case, when the UE performs PDCCH decoding, the UE may use both PDCCH candidate #5 of CORESET #0 and PDCCH candidate #5 of CORESET #1. Accordingly, the PDCCH decoding performance of the UE may be improved.

In the following description, an operation by which the UE uses all of the PDCCH candidates in a plurality of CORESETs as described above is called CORESET-wise joint decoding. For example, when two CORESETs are transmitted in different TRP(s)/beam(s), the UE may obtain a spatial diversity gain during PDCCH decoding. Therefore, the configuration may be very useful in an environment where blockage frequently occurs.

Figure 8:
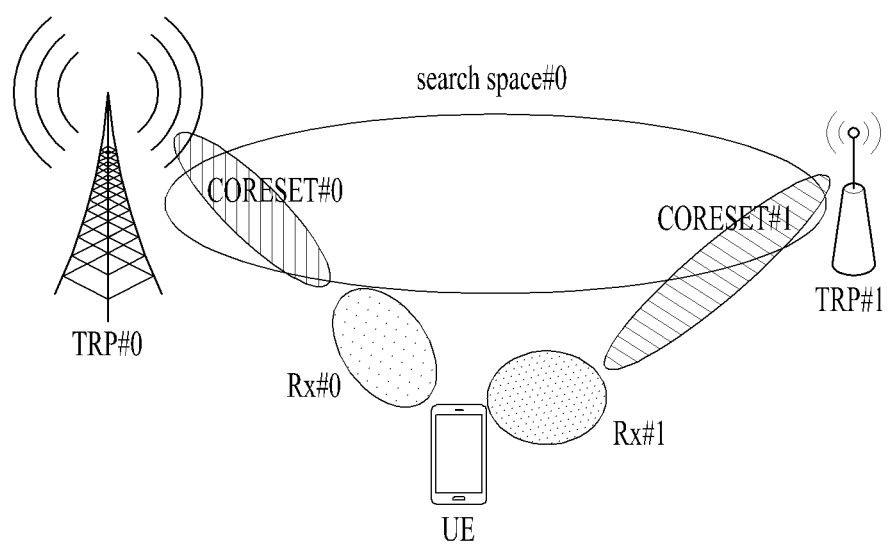
FIG. 8 is a diagram illustrating an example of a signal transmission and reception method between a user equipment (UE) and two transmission and reception points (TRPs) applicable to the present disclosure.

FIG. 8 is a diagram illustrating an example of a signal transmission and reception method between a UE and two TRPs applicable to the present disclosure.

In FIG. 8, the UE may receive CORESET #0/ #1 from TRP #0/ #1 simultaneously or sequentially based on (or using) two Rx beams. In this case, CORESET #0/ #1 may be included in the same search space (e.g., search space #0). Accordingly, the UE may expect that any PDCCH candidates included in the two CORESETs include the same DCI.

FIG. 9 is a diagram illustrating an example of resource allocation for each CORESET applicable to the present disclosure.

As shown in the left figure of FIG. 9 (FIG. 9(A)), CORESET #0/ #1 may be defined in different time/frequency resource regions. In this case, CORESET #0/ #1 may have the same DMRS scrambling ID.

On the other hand, as shown in the right figure of FIG. 9 (FIG. 9(B)), when two CORESETs are defined in the same time/frequency resource region (or overlapped on some resources), scrambling IDs of the two CORESETs may be configured differently. Otherwise, channel estimation performance may be degraded due to interference between DMRSs in different CORESETs.

Alternatively, the two CORESETs may be configured independently of each other. Accordingly, the DMRS scrambling ID of each CORESET may be configured by independent signaling (e.g., DCI or higher layer parameter (e.g., pdcch-DMRS-ScramblingID)). In this case, the UE may minimize interference between DMRSs in different CORESETs based on DMRSs generated with different scrambling IDs. Accordingly, the UE may improve channel estimation performance.

2.2. Second Operation Example

The BS may define a plurality of search spaces as one group and configure the group to the UE. In addition, the BS may configure a set of PDCCH candidates defined for each of the plurality of search spaces (or CORESETs) in the group to include the same DCI by CORESET-wise. Alternatively, the BS may indicate the above configuration to the UE.

Specifically, another signaling method based on the same/ similar motivation as the above-described first operation example will be proposed in the second operation example.

In the NR Rel-15 system, one search space may be associated with one CORESET. In other words, it is not allowed that one search space is associated with a plurality of CORESETs. Accordingly, one search space is transmitted from one TRP/beam.

On the other hand, according to the above-described first operation example, one search space may be associated with a plurality of CORESETs. Accordingly, the BS may indicate/configure to the UE that a plurality of CORESETs belonging to a search space are transmitted from a plurality of TRP(s)/beam(s), respectively.

On the contrary, according to the above-described second operation example, a plurality of search spaces may have a 1:1 relationship with different CORESETs. Based on this, the BS may group the plurality of search spaces and indicate/configure the grouping to the UE. Accordingly, the UE may expect that a set of PDCCH candidates defined for each of the plurality of search spaces (or CORESETs) include the same DCI by a unit of a search space (by a search space-wise) or by a unit of a CORESET (by a CORESET-wise).

Figure 10:
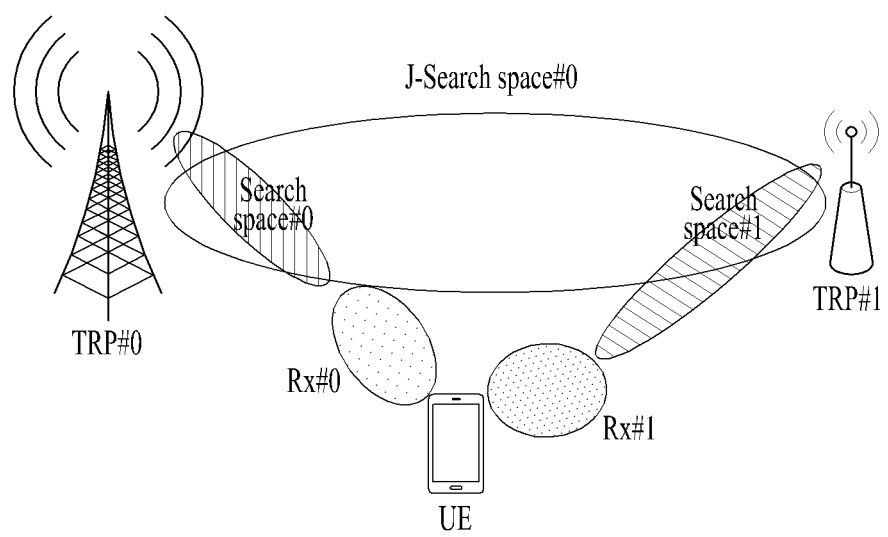
FIG. 10 is a diagram illustrating another example of a signal transmission and reception method between a UE and two TRPs applicable to the present disclosure.

FIG. 10 is a diagram illustrating another example of a signal transmission and reception method between a UE and two TRPs applicable to the present disclosure.

In FIG. 10, search space #0 and search space #1 may be grouped into one group (e.g., J-search space #0). The BS may configure the one group (e.g., J-search space #0) to the UE. Accordingly, the UE may expect that a set of PDCCH candidates defined for each of a plurality of search spaces (or CORESETs) include the same DCI on a search space basis (in a search space-wise manner) or on a CORESET basis (in a CORESET-wise manner)

2.3. Third Operation Example

According to the third operation example of the present disclosure, the UE may expect that PDCCH candidates defined for each CORESET (i) include the same DCI and (ii) have the same aggregation level (AL) and/or index (or order) in the above-described first and second operation examples.

Figure 11:
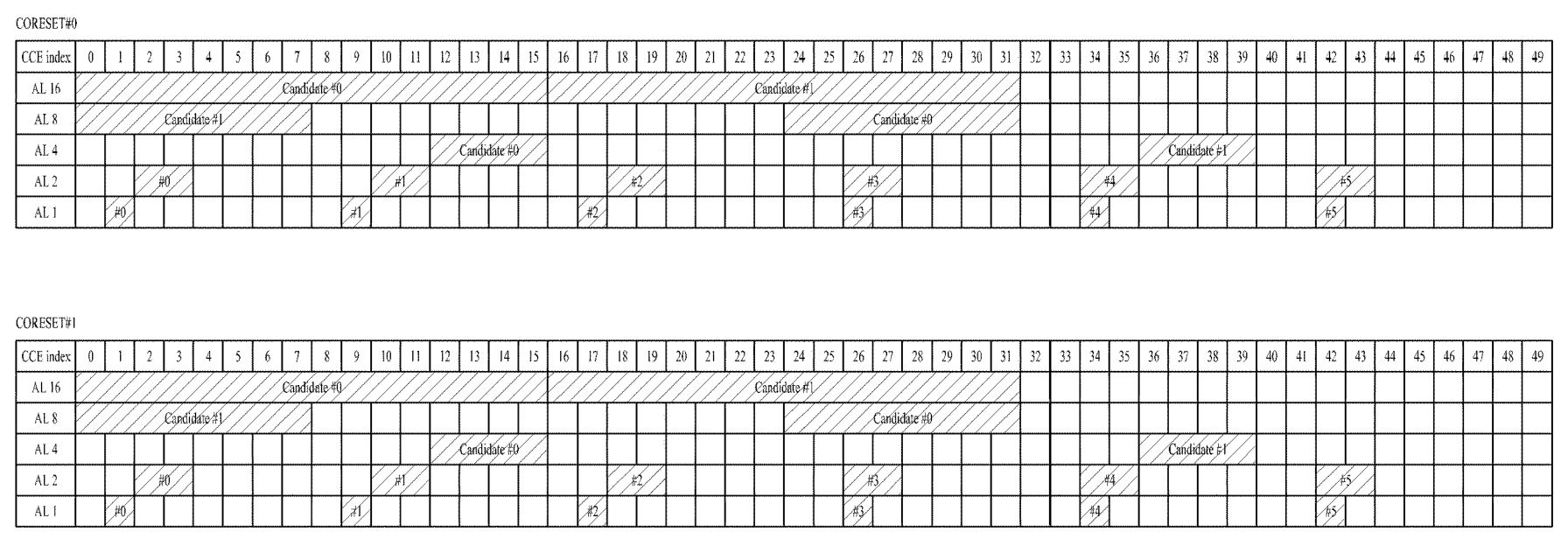

FIG. 11 is a diagram illustrating an example of PDCCH candidates that the UE searches for in CORESET #0/ #1 according to the present disclosure.

In FIG. 11, an index may mean a PDCCH candidate index in a given AL (e.g., #5=candidate #5). Also, it is assumed in FIG. 11 that candidate #0 with AL 8 in CORESET #0 and candidate #1 with AL 2 in CORESET #1 may include the same DCI. In other words, it is assumed in FIG. 11 that two PDCCH candidates including the same DCI may have different ALs.

In the prior art, the total number of PDCCH candidates to be monitored by the UE for one DCI format in CORESETs configured as shown in FIG. 11 may be defined as follows: 18 (e.g., the number of candidates in CORESET #0)×18 (e.g., the number of candidates in CORESET #1)=324. In this case, the UE complexity related to blind decoding may become too high.

However, according to the present disclosure (for example, when candidate #0 with AL 8 in CORESET #0 and candidate #0 with AL 8 in CORESET #1 include the same DCI), the total number of PDCCH candidates that the UE should monitor may be set/determined to/as 18. That is, according to the method of the present disclosure, the number of (PDCCH) candidates required for blind decoding may be set/defined/determined to be the same as the number of (PDCCH) candidates based on one CORESET.

In the present disclosure, when two PDCCH candidates including the same DCI have different ALs, coded bits for the same DCI (e.g., the same information) may have different sizes. In this case, it may be ambiguous how to combine two coded bits with different sizes.

In the conventional NR Rel-15 system, there is no concept of a redundancy version (RV) for DCI, and as a result, an operation of combining two coded bits with different sizes in DCI may not be supported.

On the other hand, when two PDCCH candidates including the same DCI have the same AL, coded bits may have the same size, and thus the above issue may not occur.

According to the present disclosure, the ALs of two CORESETs may be set/defined to be the same for joint decoding of two coded bits. Accordingly, the UE may expect that not only the sizes of coded bits of two PDCCH candidates including the same DCI but also information included therein are the same. In other words, the UE may expect that the same coded bits are transmitted from different TRP(s)/beam(s).

According to the present disclosure, when among PDCCH candidates defined for each CORESET, PDCCH candidates having the same AL and/or index (or order) on a CORESET basis (in a CORESET-wise manner) have the same DCI, it may be assumed that a PDCCH candidate pair is defined for each CORESET. For example, when candidate #0 with AL 8 in CORESET #0 and candidate #0 with AL 8 in CORESET #1 have the same DCI, these two PDCCH candidates may be defined as a PDCCH candidate pair.

In the present disclosure, the (PDCCH) candidate index may correspond to $m_{x,n_{CI}}$ of Table 25. For a given AL, the value of $m_{x,n_{CI}}$ may increase sequentially from 0 to a specific value (e.g., the number of candidates set in the corresponding AL-1, i.e., $M_{p,s,n_{CI}}^{(L)}-1$). Accordingly, the corresponding value may mean an index or order.

2.4. Fourth Operation Example

In the above-described third operation example, for PDCCH candidates in which no PDCCH candidate pair is defined on a CORESET basis (in a CORESET-wise manner), the UE may decode only one defined PDCCH candidate.

In FIG. 11, when some REs belonging to CCE index 28 of CORESET #1 overlap with a synchronization signal block (SSB), the UE may not decode all PDCCH candidates including CCE index 28. Therefore, candidate #1 with AL 16 and candidate #0 with AL8 included in CORESET #0 may not be included in CORESET #1. Accordingly, no PDCCH candidate pair may not be defined for the (PDCCH) candidates on a CORESET basis (in a CORESET-wise manner). In this case, the UE may decode only candidate #1 with AL #16 and candidate #0 with AL #8 included in CORESET #0.

The remaining PDCCH candidates (e.g., candidate #0 with AL #16, candidate #1 with AL #8, candidate #0/1 with AL #4, etc.) may all be included in CORESET #0/ #1 (that is, a PDCCH candidate pair may be defined in a CORESET-wise manner). Accordingly, the UE may perform (CORESET-wise) joint decoding of the (PDCCH) candidates.

If it is assumed that the network always guarantees a PDCCH candidate pair for the UE, the UE may skip decoding of PDCCH candidates in which no PDCCH candidate pair is defined. In this case, the UE may reduce UE complexity.

2.5. Fifth Operation Example

In the above-described third operation example, for PDCCH candidates in which no PDCCH candidate pair is defined on a CORESET basis (in a CORESET-wise manner), a PDCCH candidate pair may be redefined (for example, a candidate index (or order) may be cyclically shifted).

In the fourth operation example, no PDCCH candidate pair may be defined for candidate #1 with AL #16 and candidate #0 with AL #8 in CORESET #0. On the other hand, according to the fifth operation example, candidate #1 with AL #16 in CORESET #0 and candidate #0 with AL #16 in CORESET #1 may be defined as a PDCCH candidate pair.

TABLE 26

|  | Pair #n | New Pair #n + 1 | New Pair #m | Pair #m + 1 |
|---|---|---|---|---|
| CORESET#0 | Candidate#0 with AL#16 | Candidate#1 with AL#16 | Candidate#0 with AL#8 | Candidate#1 with 4L#8 |
| CORESET#1 | Candidate#0 with AL#16 | Candidate#0 with AL#16 | Candidate#1 with AL#8 | Candidate#1 with AL#8 |

Table 26 shows PDCCH candidate pairs defined according to the fifth operation example. According to the fifth operation example, a new PDCCH candidate pair named 'New Pair' may be added, unlike the fourth operation example described above.

Accordingly, the UE may expect that candidate #1 with AL #16 in CORESET #0 and candidate #0 with AL #16 in CORESET #1 include the same DCI. Accordingly, the UE may improve PDCCH decoding performance by joint decoding the corresponding candidates.

According to the present disclosure, the UE may expect that candidate #0 with AL #8 in CORESET #0 and candidate #1 with AL #8 in CORESET #1 are a PDCCH candidate pair.

In another example, to redefine a PDCCH candidate pair, a PDCCH candidate with the maximum index may be repeatedly applied, instead of cyclically shifting a candidate index (or order).

Figure 12:
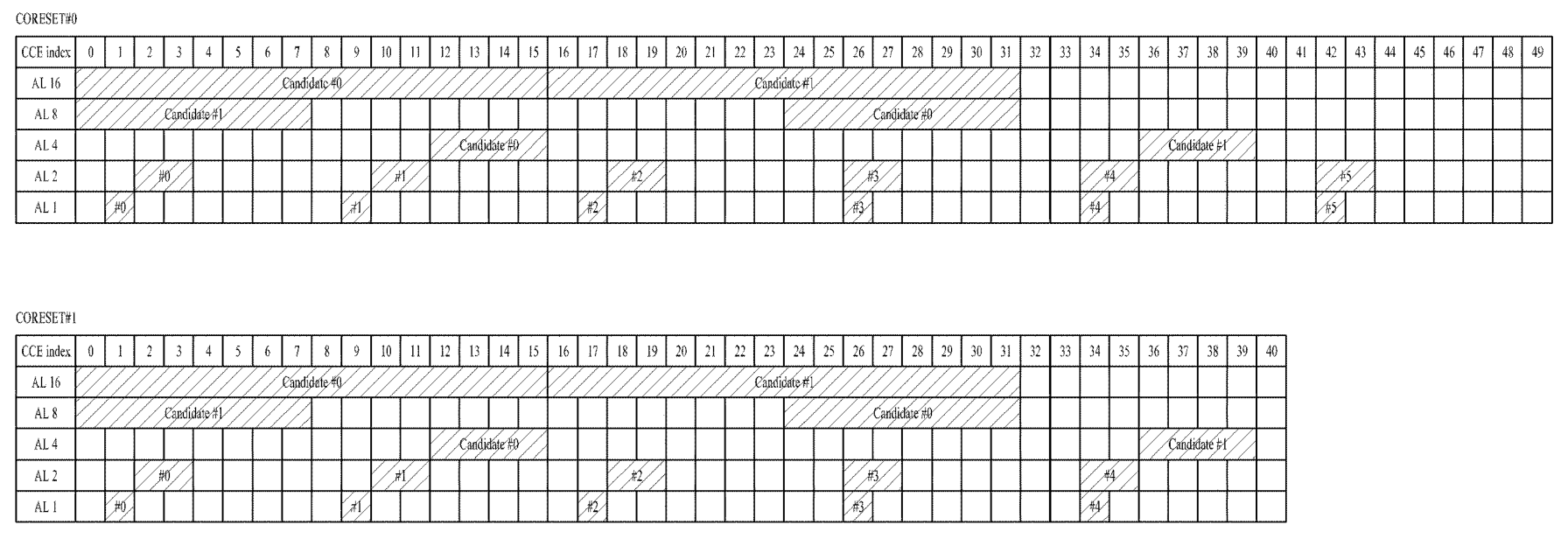

FIG. 12 is a diagram illustrating another example of PDCCH candidates that the UE searches for in CORESET #0/ #1 according to the present disclosure.

In FIG. 12, it is assumed that the maximum CCE index of CORESET #1 is defined as 40, unlike FIG. 11. Thus, in the above-described fourth operation example, no PDCCH candidate pair may be defined for candidate #5 with AL #1/ #2 in CORESET #0 on a CORESET basis (in a CORESET-wise manner).

According to the method (e.g., max index) proposed in the present disclosure, PDCCH candidate pairs may be redefined as shown in Table 27 below.

TABLE 27

|  | Pair #n | New Pair #n + 1 | New Pair #m | Pair #m + 1 |
|---|---|---|---|---|
| CORESET#0 | Candidate#4 with AL#2 | Candidate#5 with AL#2 | Candidate#4 with AL#1 | Candidate#5 with AL#1 |
| CORESET#1 | Candidate#4 with AL#2 | Candidate#4 with AL#2 | Candidate#4 with AL#1 | Candidate#4 with AL#1 |

If two CORESETs have different sizes or if some CCEs in a specific CORESET are dropped (for example, if some CCEs are not defined), no CORESET-wise PDCCH candidate pair may be defined for some PDCCH candidates.

However, according to the present disclosure, a CORESET-wise PDCCH candidate pair may be defined for PDCCH candidates. In this case, according to the above-described first example, the BS may transmit DCI, which is to be repeatedly transmitted, to the UE through candidate #0 or candidate #1 in CORESET #0.

According to the above-described fourth operation example, when the BS repeatedly transmits DCI, there may be a restriction that the BS needs to transmit the DCI only through candidate #0 in CORESET #0. However, according to the fifth operation example, the BS may be provided with the flexibility for DCI allocation.

2.6. Sixth Operation Example

When a plurality of CORESETs are configured in one search space, the UE may expect that the total number of CCEs for CCE index calculation is equal to the total number of CCEs included in the CORESETs.

Specifically, the UE may obtain the CCE index for a specific PDCCH candidate with a specific AL according to Equation 1 below.

In Equation 1, $N_{CCE,p}$ denotes the total number of CCEs defined for a corresponding CORESET.

When two CORESETs are configured in one search space as described above, the UE may expect that the value of $N_{CCE,p}$ is equal to the total number of CCEs included in the two CORESETs. For example, if the numbers of CCEs in two CORESETs are 50 and 40, respectively, the UE may expect that $N_{CCE,p}$ is 90.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

2.7. Seventh Operation Example

When a plurality of CORESETs are configured in one search space, the UE may expect that at least one of (i) signaling related to an independent period and offset (e.g., higher layer parameter monitoringSlotPeriodicityAndOffset), (ii) signaling related to the position of a CORESET in a slot (e.g., higher layer parameter monitoringSymbolWithinSlot), and/or (iii) signaling related to a duration to be monitored within one search space occasion (e.g., higher layer parameter duration) is configured for each CORESET. In this case, if there is a parameter that is not independently configured for each CORESET, the UE may assume that the same parameter is applied to all CORESETs.

In the present disclosure, the above-described higher layer parameters may be defined as described in section 1.9.

In the first example applicable to the present disclosure, it is assumed that the higher layer parameter SearchSpace IE may include the following parameters.
controlResourceSetID #0
controlResourceSetID #1
monitoringSlotPeriodicityAndOffset=sl4 with 1
monitoringSlotPeriodicityAndOffset1=sl4 with 1
monitoringSymbolWithinSlot=10 . . . 0
monitoringSymbolWithinSlot1=010 . . . 0
duration=2

In this case, the UE may set both the period and offset of CORESET #0/ #1 to "sl4 with 1 (the period is four slots and the offset is one slot)" based on the signaling. In this case, if duration/related to the higher layer parameter duration is not separately configured, the UE may expect/assume that two CORESETs have the same duration (i.e., two-slot duration). Meanwhile, the UE may expect/assume that the position of the first symbol of a slot in CORESET #0/ #1 is the zeroth/first symbol based on the signaling.

According to the second example applicable to the present disclosure, when monitoringSlotPeriodicityAndOffset of two CORESETs are the same but monitoringSlotPeriodicityAndOffset of the two CORESETs are different in the first example, the CORESETs may be configured not to overlap in the same time/frequency resources. For example, when two CORESETs are configured as described above, the two CORESETs may be defined in different time/frequency resource regions as shown in FIG. 9(A).

In this case, the same DMRS scrambling ID may be configured for the two CORESETs.

On the other hand, when monitoringSlotPeriodicityAndOffset and monitoringSymbolsWithinSlot of two CORESETs are configured to be the same, the CORESETs may be configured to overlap on the same time/frequency resources. For example, when two CORESETs are configured as described above, the two CORESETs may be defined in the same time/frequency resource region or may be defined to overlap in some resources as shown in FIG. 9(B).

In this case, different DMRS scrambling IDs may be configured for the two CORESETs. Otherwise, channel estimation performance may be degraded due to interference between DMRSs in different CORESETs.

According to the present disclosure, since two CORESETs are independently configured, the BS may configure different DMRS scrambling IDs for the CORESETs to the UE through the higher layer parameter pdcch-DMRS-ScramblingID. In this case, the UE may minimize interference between DMRSs in different CORESETs by using the DMRSs based on different scrambling IDs, thereby improving channel estimation performance.

In the second example, the configuration in which for the two CORESETs, the same time/frequency resources are allocated or some resources are allocated to overlap may be valid only for a UE capable of simultaneously receiving related signals on two Rx beams. Thus, the UE may expect that all cases including the case shown in FIG. 12 may be configured.

According to the present disclosure, the UE and BS may transmit and receive a PDCCH as follows based on the various operation example(s) described above. In this case, the BS may include two TRPs (e.g., TRP #0 and TRP #1). The BS may configure one of the following two methods for the UE.

(1) First Method

Figure 13:
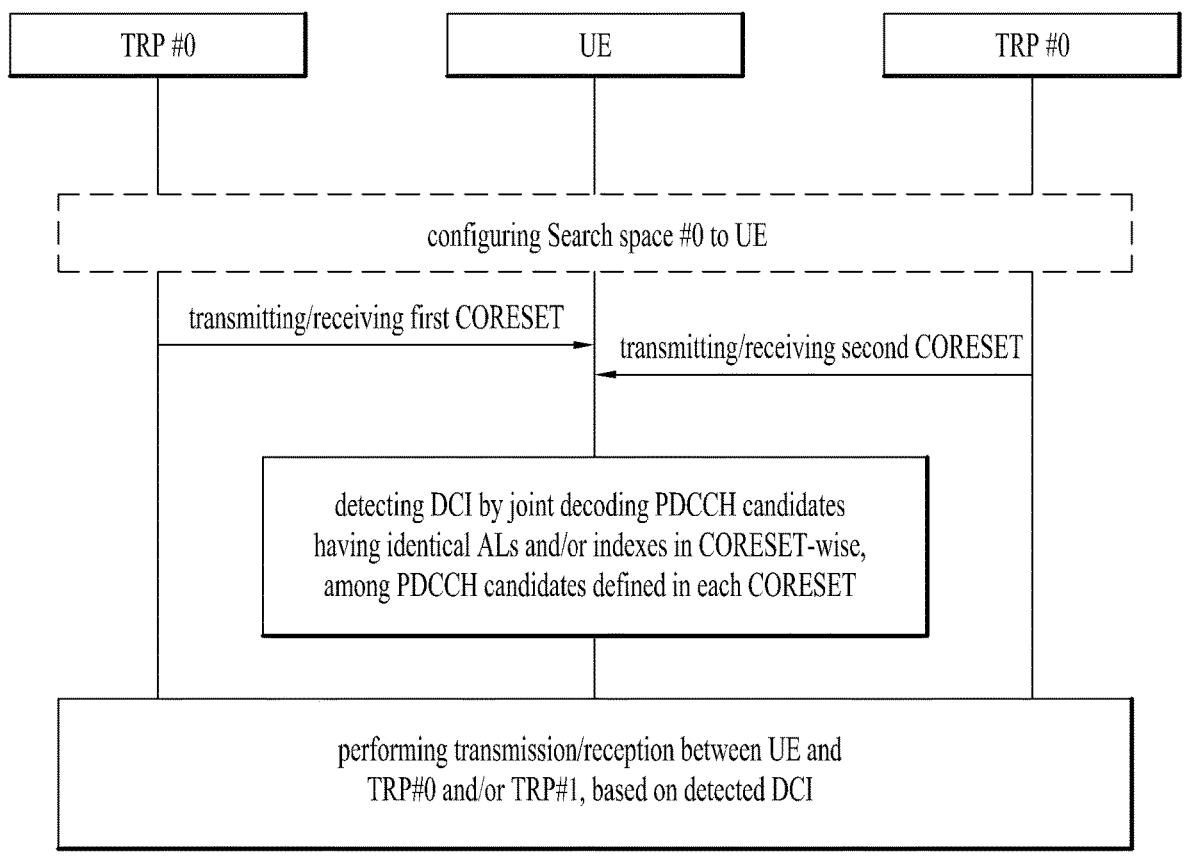
FIGS. 13 and 14 are diagrams illustrating operation examples of a UE and a base station (BS) according to methods proposed in the present disclosure.

FIG. 13 is a diagram illustrating operation examples of the UE and BS according to the first method of the present disclosure.

Referring to FIGS. 8 and 13, the BS may configure, to the UE, search space #0 including search spaces (e.g., CORESET #0 and CORESET #1) for each TRP.

Specifically, the BS may configure search space #0 including CORESET #0 and CORESET #1 to the UE. In this case, search space #0 may be configured through higher layer signaling (e.g., RRC, MAC-CE, etc.) or a physical layer signal (e.g., DCI). The configuration may be performed by TRP #0, TRP #1, or other entities. The UE may receive a CORESET from each TRP and detect DCI included in the CORESET received from each TRP according to one or more proposals proposed in the present disclosure.

For example, the UE may detect DCI with low blind decoding (BD) complexity and high success probability based on the various operation example(s) described above in this document.

Thereafter, the UE may transmit and receive related signals with TRP #0 and/or TRP #1 based on the detected DCI.

(2) Second Method

Figure 14:
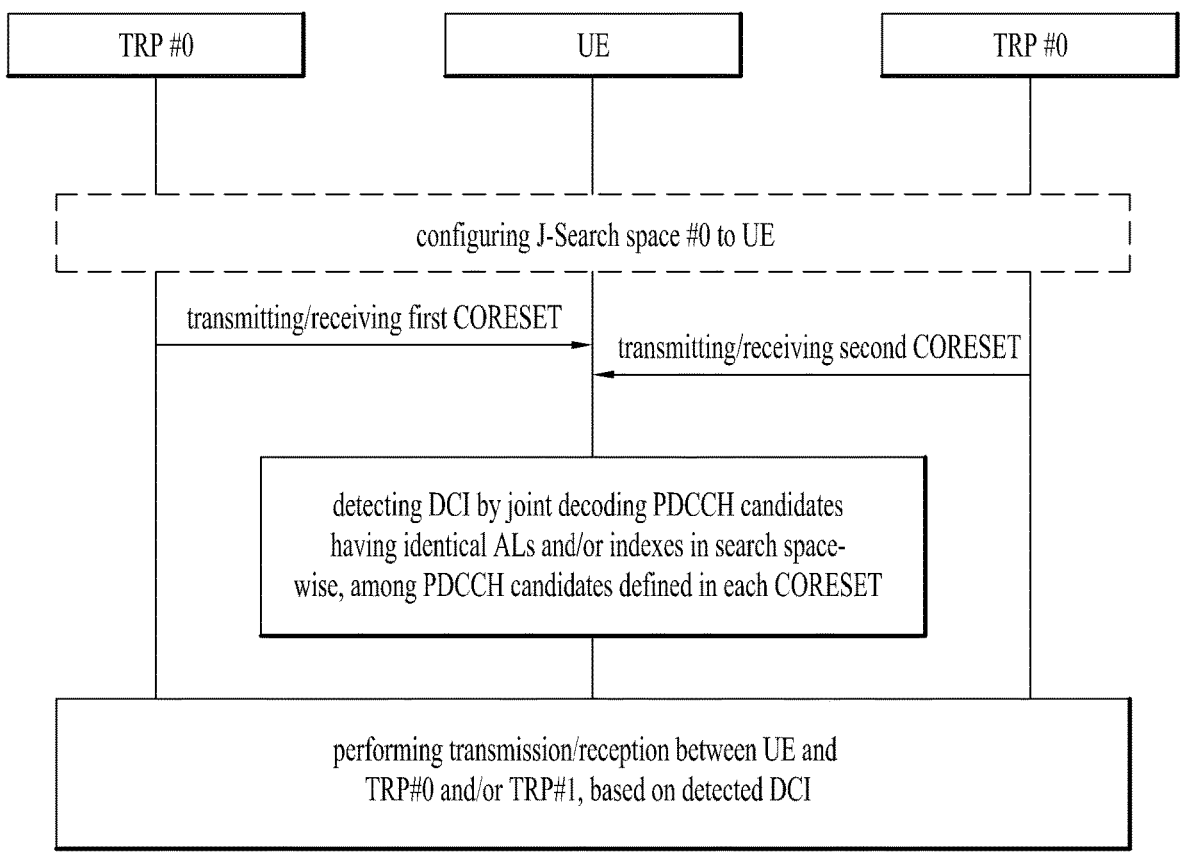

FIG. 14 is a diagram illustrating operation examples of the UE and BS according to the second method of the present disclosure.

Referring to FIGS. 10 and 14, the BS may configure J-search space #0 including search spaces (e.g., search space #0 and search space #1) for each TRP to the UE.

Specifically, the BS may configure J-search space #0 including search space #0 and search space #1 to the UE. In this case, search space #0 and search space #1 may have a connection relationship with CORESETs #0 and #1, respectively. Search space #0/ #1 and J-search space #0 may be configured through higher layer signaling (e.g., RRC, MAC-CE, etc.) or a physical layer signal (e.g., DCI). The configuration may be performed by TRP #0, TRP #1, or other entities. The UE may receive a search space from each TRP and detect DCI included in the search space received from each TRP according to one or more proposals proposed in the present disclosure.

For example, the UE may detect DCI with low BD complexity and high success probability based on the various operation example(s) described above in this document.

Thereafter, the UE may transmit and receive related signals with TRP #0 and/or TRP #1 based on the detected DCI.

Figure 15:
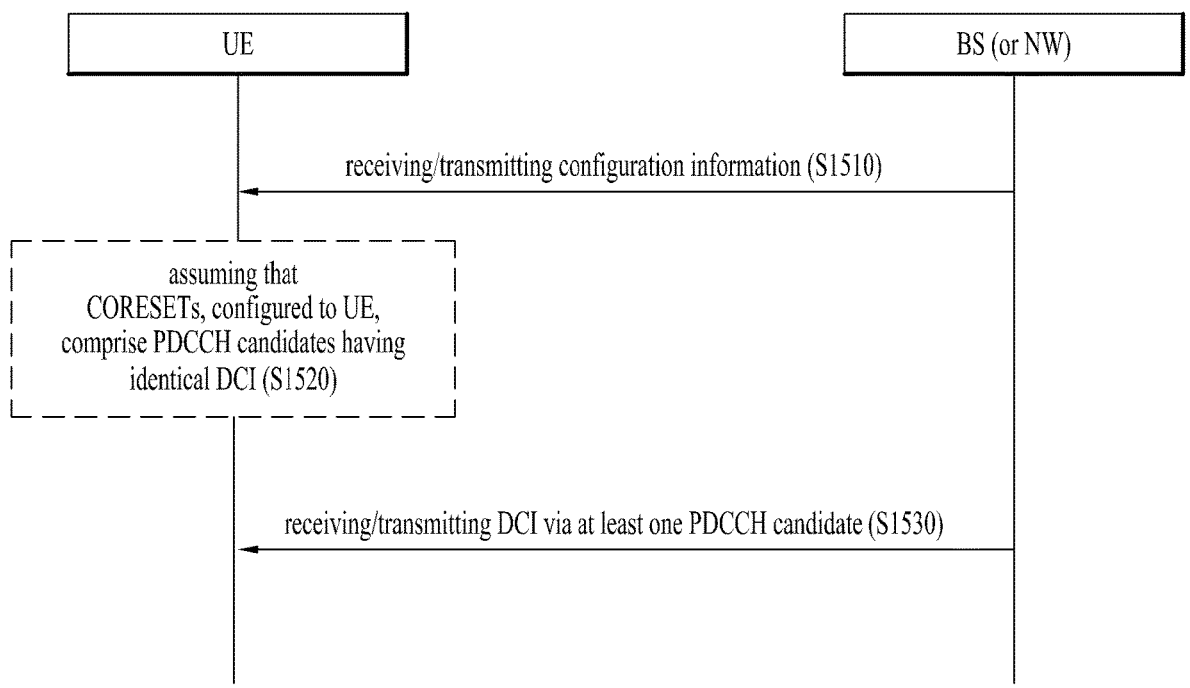
FIG. 15 is a diagram schematically illustrating operations of a UE and a BS according to an embodiment of the present disclosure.
Figure 16:
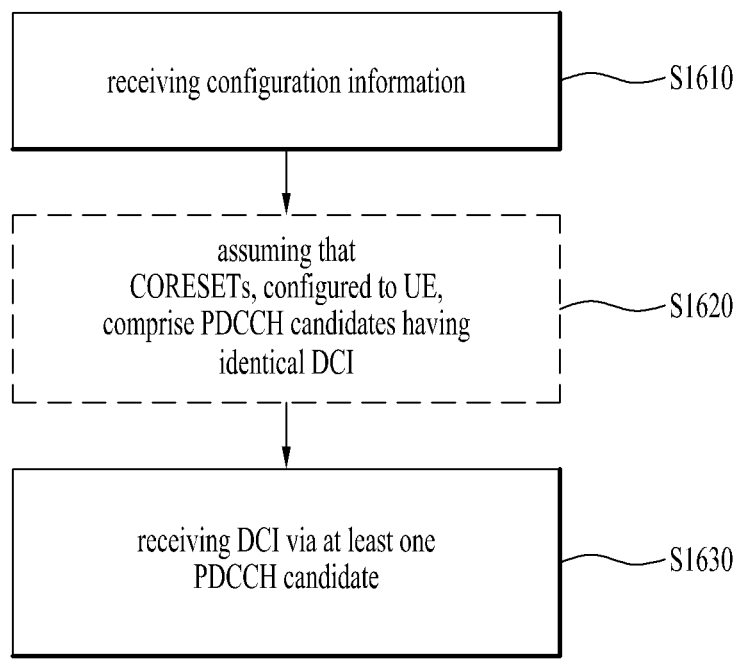
FIG. 16 is a flowchart illustrating operations of the UE according to an embodiment of the present disclosure.
Figure 17:
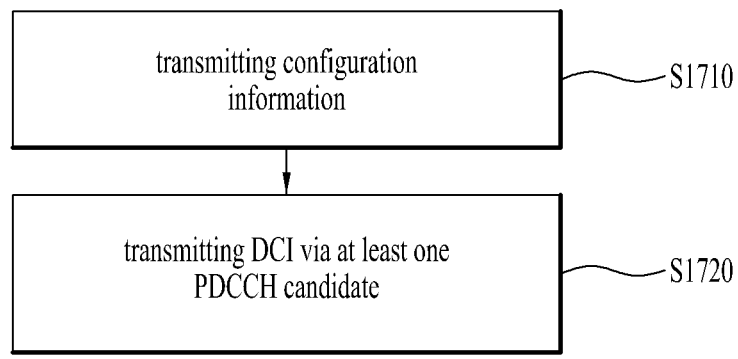
FIG. 17 is a flowchart illustrating operations of the BS according to an embodiment of the present disclosure.

FIG. 15 is a diagram schematically illustrating operations of the UE and BS according to an embodiment of the present disclosure, FIG. 16 is a flowchart illustrating operations of the UE according to an embodiment of the present disclosure, and FIG. 17 is a flowchart illustrating operations of the BS according to an embodiment of the present disclosure.

The UE may receive from the BS configuration information about (i) a configuration of a first CORESET and a configuration of a second CORESET for the UE and (ii) a configuration in which a first PDCCH candidate in the first CORESET and a second PDCCH candidate in the second CORESET include the same DCI (S1510 and S1610). Correspondingly, the BS may transmit the configuration information to the UE (S1510 and S1710). In the present disclosure, the configuration information may be transmitted and received based on at least one of a PDCCH signal (e.g., DCI), an MAC-CE, and RRC signaling or any combination of at least two or more thereof.

The UE may assume, based on the configuration information, that PDCCH candidates having the same DCI are included in CORESETs configured for the UE (e.g., the first CORESET, the second CORESET, etc.) (S1520 and S1620).

Accordingly, the UE may receive the DCI through at least one PDCCH candidate of the first PDCCH candidate in the first CORESET or the second PDCCH candidate in the second CORESET based on the configuration information (S1530 and S1630). Correspondingly, the BS may transmit the DCI to the UE through the at least one PDCCH candidate (S1530 and S1720).

According to the present disclosure, one search space including the first CORESET and the second CORESET may be configured for the UE based on the configuration information.

The UE may expect, based on the configuration information, that the first PDCCH candidate in the first CORESET and the second PDCCH candidate in the second CORESET include the same DCI.

According to the present disclosure, based on that the first CORESET and the second CORESET partially or fully overlap on the time and frequency domains, a first DMRS scrambling ID related to the first CORESET may be equal to a second DMRS scrambling ID related to the second CORESET.

According to the present disclosure, based on that the first CORESET and the second CORESET do not overlap on the time and frequency domains, a first DMRS scrambling ID related to the first CORESET may be different from a second DMRS scrambling ID related to the second CORESET.

According to the present disclosure, based on the configuration information, (i) a plurality of search spaces may be configured for the UE, and (ii) each of the plurality of search spaces may be configured to include one CORESET.

In this case, the UE may expect, based on the configuration information, that the first PDCCH candidate in the first CORESET in a first search space and the second PDCCH candidate in the second CORESET in a second search space include the same DCI.

According to the present disclosure, a plurality of CORESETs may be related to TCI states, respectively, and each of the TCI states may be related to one RS set.

According to the present disclosure, the UE may expect, based on the configuration information, that the first PDCCH candidate in the first CORESET and the second PDCCH candidate in the second CORESET have at least one of the same AL or the same AL index.

According to the present disclosure, the UE may expect, based on the configuration information, that the total number of CCEs for CCE index calculation is equal to the sum of the number of CCEs included in the first CORESET and the number of CCEs included in the second CORESET.

According to the present disclosure, the UE may expect, based on the configuration information, that (i) one or more parameters commonly applied to the first CORESET and the second CORESET are commonly configured for the UE and (ii) one or more parameters independently applied to the first CORESET and the second CORESET are independently configured for each CORESET.

In this case, the one or more parameters may include at least one of: (i) period and offset information related to a corresponding CORESET; (ii) location information in a slot related to the corresponding CORESET; or (iii) monitoring duration information in one search space occasion related to the corresponding CORESET.

According to the present disclosure, based on that (i) the same period and offset information is configured for the first CORESET and the second CORESET and (ii) different in-slot location information is configured for the first CORESET and the second CORESET based on the configuration information, the UE may expect that the first CORESET and the second CORESET are allocated not to overlap in the time and frequency domains and the first CORESET and the second CORESET have the same DMRS scrambling ID.

According to the present disclosure, based on that (i) the same period and offset information is configured for the first CORESET and the second CORESET and (ii) the same in-slot location information is configured for the first CORESET and the second CORESET based on the configuration information, the UE may expect that the first CORESET and the second CORESET are allocated to partially or fully overlap in the time and frequency domains and the first CORESET and the second CORESET have different DMRS scrambling IDs.

According to the present disclosure, the configuration in which the first PDCCH candidate and the second PDCCH candidate include the same DCI may include at least one of (i) a configuration in which the first PDCCH candidate and the second PDCCH candidate include the same DCI content or (ii) a configuration in which the first PDCCH candidate and the second PDCCH candidate include the same DCI format.

It is obvious that each of the examples of the proposed methods may also be included as one implementation method, and thus each example may be regarded as a kind of proposed method. Although the above-described embodiments may be implemented independently, some of the embodiments may be combined and implemented. In addition, it may be regulated that information on whether the embodiments are applied (or information on rules related to the embodiments) are transmitted from the BS to the UE through a predefined signal (e.g., a physical layer signal, a higher layer signal, etc.).

3. Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
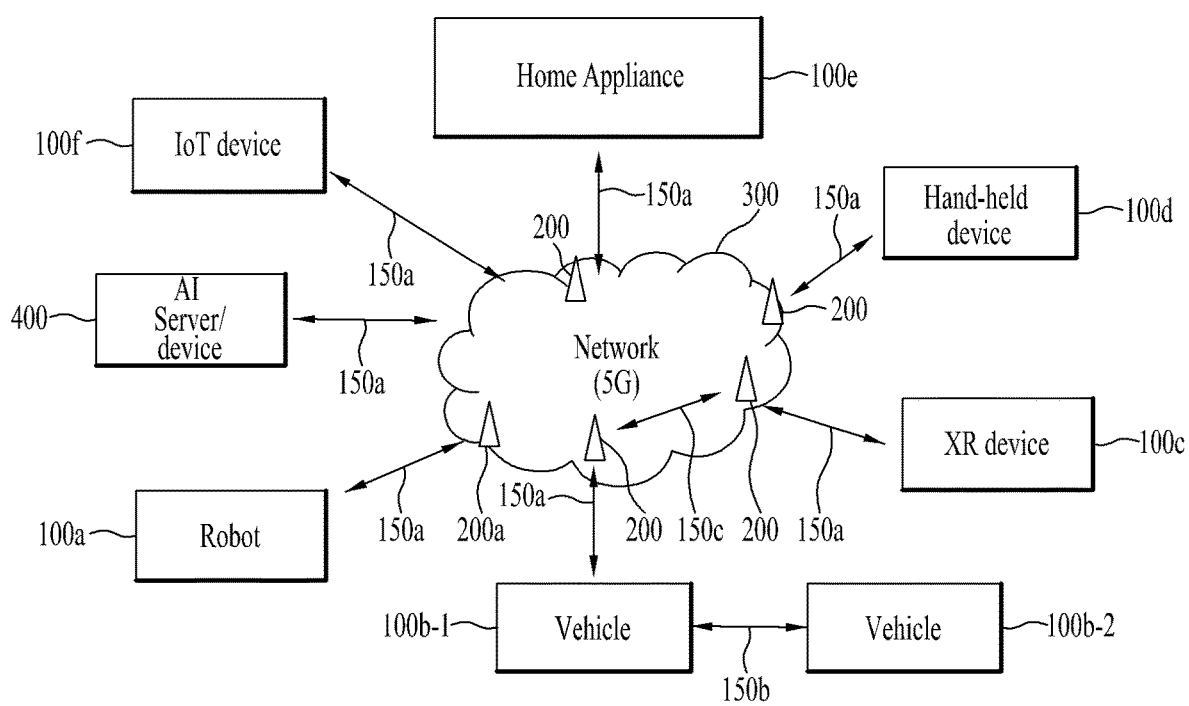
FIG. 18 illustrates a communication system applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

4. Example of Wireless Device to Which the Present Disclosure is Applied

Figure 19:
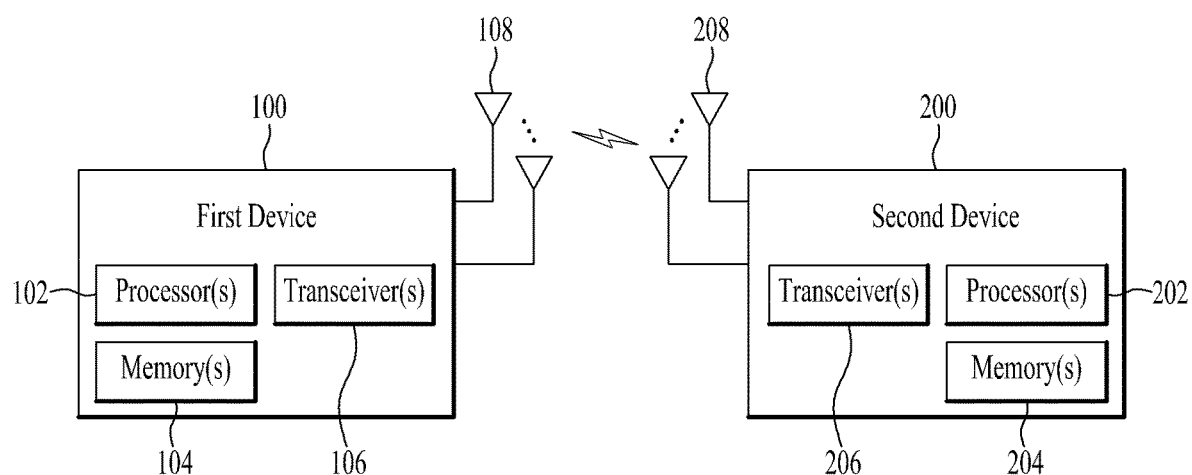
FIG. 19 illustrates wireless devices applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

5. Example of Use of Wireless Device to Which the Present Disclosure is Applied

FIG. 36 illustrates another example of a wireless device applied to the present disclosure. The wireless device may be implemented in various forms according to a use case/service (refer to FIG. 18).

Figure 20:
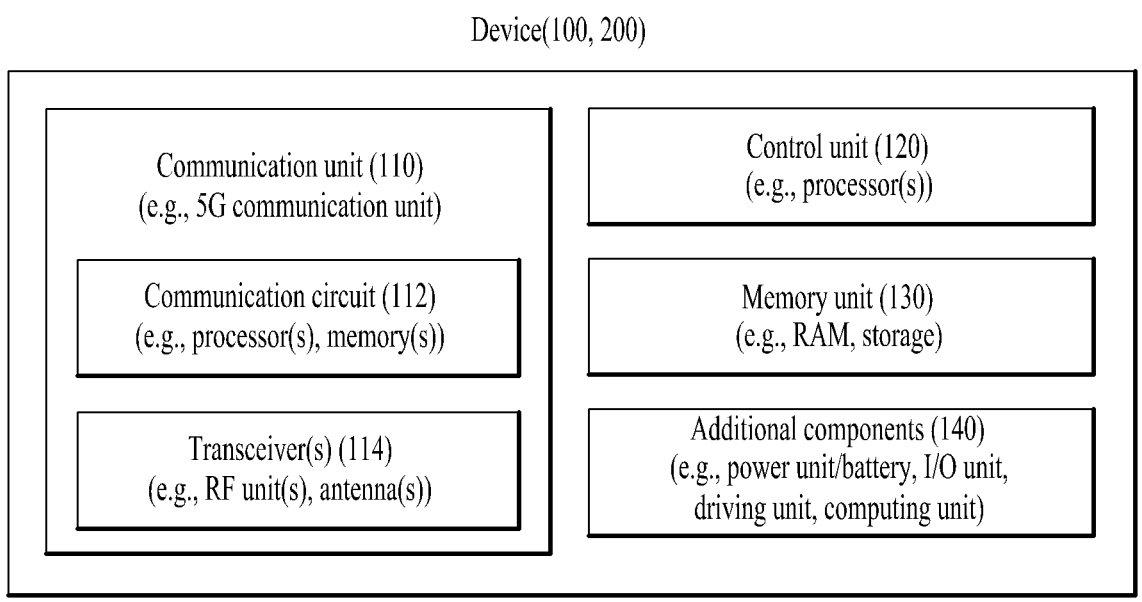
FIG. 20 illustrates other wireless devices applied to the present disclosure.

Referring to FIG. 20, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, an implementation example of FIG. 20 will be described in detail with reference to the drawings.

5.1. Example of Portable Device to Which the Present Disclosure is Applied

Figure 21:
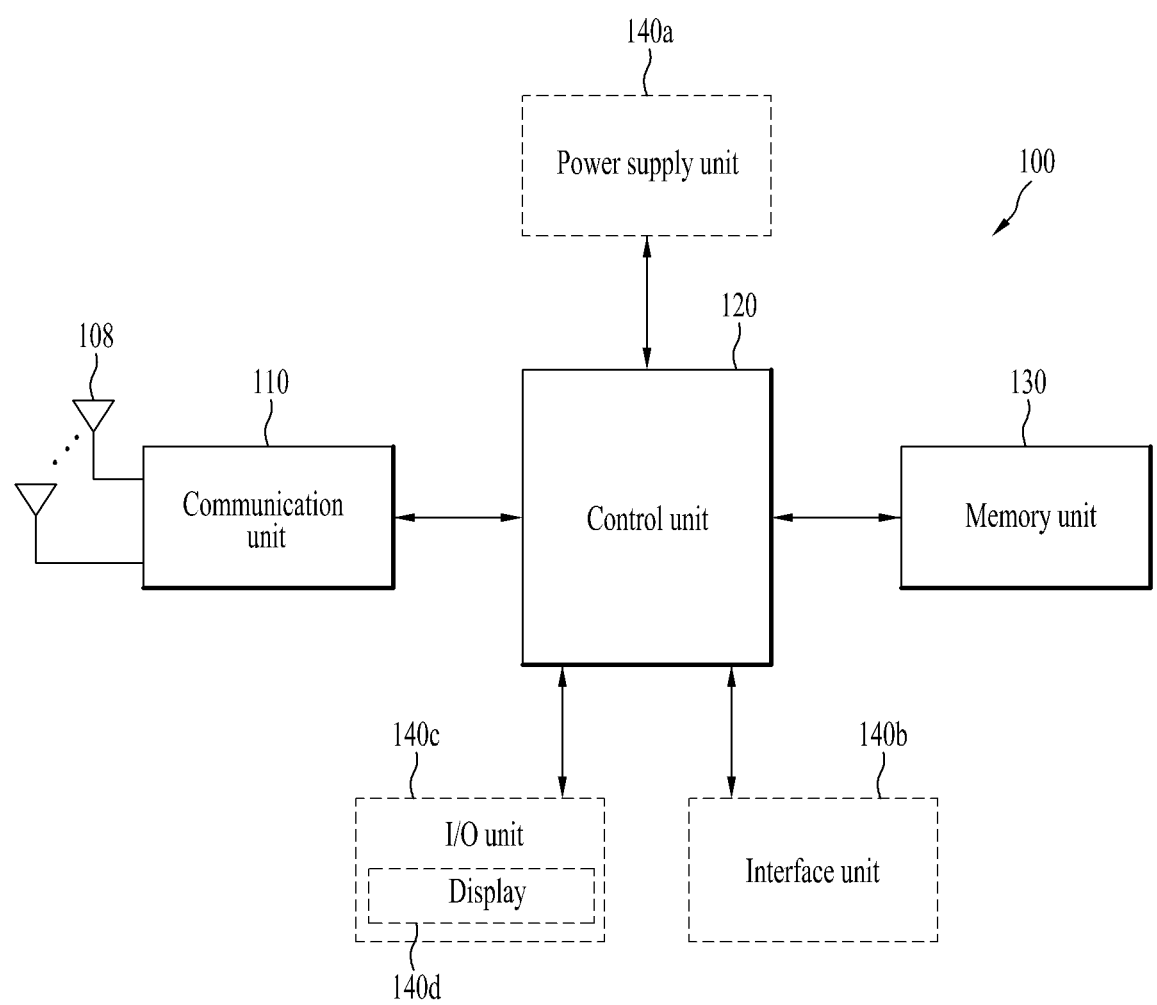
FIG. 21 illustrates a portable device applied to the present disclosure.

FIG. 21 illustrates an exemplary portable device to which the present disclosure is applied. The portable device may be any of a smartphone, a smart pad, a wearable device (e.g., a smart watch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 21, a portable device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 36, respectively.

The communication unit 110 may transmit and receive signals (e.g., data and control signals) to and from other wireless devices or BSs. The control unit 120 may perform various operations by controlling components of the portable device 100. The control unit 120 may include an application processor (AP). The memory unit 130 may store data/parameters/programs/code/instructions needed to drive the portable device 100. Further, the memory unit 130 may store input/output data/information. The power supply unit 140a may supply power to the portable device 100 and include a wired/wireless charging circuit, a battery, and so on. The interface unit 140b may support connection of the portable device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in data communication, the I/O unit 140c may obtain information/signals (e.g., touch, text, voice, images, or video) input by the user, and the stored information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
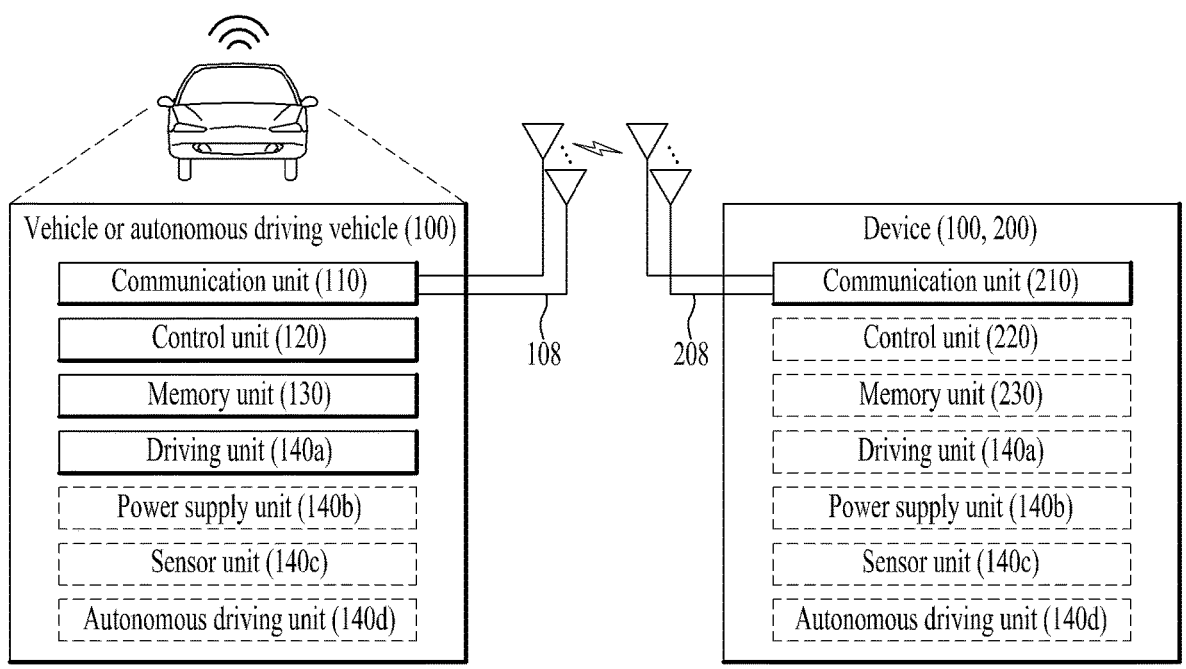
FIG. 22 illustrates a vehicle or an autonomous driving vehicle applied to the present disclosure.

5.2. Example of Vehicle or Autonomous Driving Vehicle to which the Present Disclosure is Applied FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 36, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may obtain information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically obtain recent traffic information data from the external server and obtain surrounding traffic information data from neighboring vehicles.

During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

Embodiments of the present disclosure are applicable to various wireless access systems. The various wireless access systems include, for example, a 3rd generation partnership project (3GPP) or 3GPP2 system. The embodiments of the present disclosure are applicable to all technical fields in which the various wireless access systems find their applications as well as the various wireless access systems. Furthermore, the proposed methods may also be applied to an mmWave communication system using an ultra-high frequency band.

Additionally, the embodiments of the present disclosure are applicable to various applications including an autonomous driving vehicle, a drone, and so on.

What is claimed is:

1. A method of receiving downlink control information (DCI) by a user equipment (UE) in a wireless communication system, the method comprising:
  receiving, from a base station, configuration information about (i) a configuration of a first control resource set (CORESET) and a configuration of a second CORESET for the UE and (ii) a configuration in which a first physical downlink control channel (PDCCH) candidate in the first CORESET and a second PDCCH candidate in the second CORESET include same DCI; and
  receiving the DCI through at least one PDCCH candidate of the first PDCCH candidate in the first CORESET or the second PDCCH candidate in the second CORESET based on the configuration information,
  wherein based on the configuration information, the UE expects that a total number of control channel elements (CCEs) for CCE index calculation is equal to a sum of a number of CCEs included in the first CORESET and a number of CCEs included in the second CORESET.

2. The method of claim 1,
wherein one search space including the first CORESET and the second CORESET is configured for the UE based on the configuration information.

3. The method of claim 2,
wherein based on the configuration information, the UE expects that the first PDCCH candidate in the first CORESET and the second PDCCH candidate in the second CORESET include the same DCI.

4. The method of claim 1,
wherein based on that the first CORESET and the second CORESET partially or fully overlap on time and frequency domains, a first demodulation reference signal (DMRS) scrambling identifier (ID) related to the first CORESET is different from a second DMRS scrambling ID related to the second CORESET.

5. The method of claim 1,
wherein based on that the first CORESET and the second CORESET do not overlap on time and frequency domains, a first demodulation reference signal (DMRS) scrambling identifier (ID) related to the first CORESET is equal to a second DMRS scrambling ID related to the second CORESET.

6. The method of claim 1,
wherein based on the configuration information, (i) a plurality of search spaces are configured for the UE, and (ii) each of the plurality of search spaces is configured to include one CORESET.

7. The method of claim 6,
wherein based on the configuration information, the UE expects that the first PDCCH candidate in the first CORESET in a first search space and the second PDCCH candidate in the second CORESET in a second search space include the same DCI.

8. The method of claim 1,
wherein a plurality of CORESETs are related to transmission configuration indicator (TCI) states, respectively, and
wherein each of the TCI states is related to one reference signal (RS) set.

9. The method of claim 1,
wherein based on the configuration information, the UE expects that the first PDCCH candidate in the first CORESET and the second PDCCH candidate in the second CORESET have at least one of a same aggregation level (AL) or a same AL index.

10. The method of claim 1,
wherein based on the configuration information, the UE expects that (i) one or more parameters commonly applied to the first CORESET and the second CORESET are commonly configured for the UE and (ii) one or more parameters independently applied to the first CORESET and the second CORESET are independently configured for each CORESET.

11. The method of claim 10,
wherein the one or more parameters include at least one of:
(i) period and offset information related to a corresponding CORESET;
(ii) location information in a slot related to the corresponding CORESET; or
(iii) monitoring duration information in one search space occasion related to the corresponding CORESET.

12. The method of claim 1,
wherein based on that (i) same period and offset information is configured for the first CORESET and the second CORESET and (ii) different in-slot location information is configured for the first CORESET and the second CORESET based on the configuration information, the UE expects that the first CORESET and the second CORESET are allocated not to overlap on time and frequency domains and the first CORESET and the second CORESET have a same demodulation reference signal (DMRS) scrambling identifier (ID).

13. The method of claim 1,
wherein based on that (i) same period and offset information is configured for the first CORESET and the second CORESET and (ii) same in-slot location information is configured for the first CORESET and the second CORESET based on the configuration information, the UE expects that the first CORESET and the second CORESET are allocated to partially or fully overlap on time and frequency domains and the first CORESET and the second CORESET have different demodulation reference signal (DMRS) scrambling identifiers (IDs).

14. The method of claim 1,
wherein the configuration in which the first PDCCH candidate and the second PDCCH candidate include the same DCI comprises at least one of (i) a configuration in which the first PDCCH candidate and the second PDCCH candidate include same DCI content or (ii) a configuration in which the first PDCCH candidate and the second PDCCH candidate include a same DCI format.

15. A user equipment (UE) configured to receive downlink control information (DCI) in a wireless communication system, the UE comprising:
at least one transmitter;
at least one receiver;
at least one processor; and
at least one memory operably connected to the at least one processor and configured to store instructions that, when executed, cause the at least one processor to perform operations comprising:
receiving, from a base station, configuration information about (i) a configuration of a first control resource set (CORESET) and a configuration of a second CORESET for the UE and (ii) a configuration in which a first physical downlink control channel (PDCCH) candidate in the first CORESET and a second PDCCH candidate in the second CORESET include same DCI; and
receiving the DCI through at least one PDCCH candidate of the first PDCCH candidate in the first CORESET or the second PDCCH candidate in the second CORESET based on the configuration information,
wherein based on the configuration information, the UE expects that a total number of control channel elements (CCEs) for CCE index calculation is equal to a sum of a number of CCEs included in the first CORESET and a number of CCEs included in the second CORESET.

16. The UE of claim 15, wherein the UE is configured to communicate with at least one of a mobile terminal, a network, or an autonomous driving vehicle other than a vehicle including the UE.

17. A base station configured to transmit downlink control information (DCI) in a wireless communication system, the base station comprising:
at least one transmitter;
at least one receiver;
at least one processor; and
at least one memory operably connected to the at least one processor and configured to store instructions that, when executed, cause the at least one processor to perform operations comprising:
transmitting, to a user equipment (UE), configuration information about (i) a configuration of a first control resource set (CORESET) and a configuration of a second CORESET for the UE and (ii) a configuration in which a first physical downlink control channel (PDCCH) candidate in the first CORESET and a second PDCCH candidate in the second CORESET include same DCI; and
transmitting the DCI through at least one PDCCH candidate of the first PDCCH candidate in the first CORESET or the second PDCCH candidate in the second CORESET based on the configuration information,
wherein based on the configuration information, a total number of control channel elements (CCEs) for CCE index calculation is equal to a sum of a number of CCEs included in the first CORESET and a number of CCEs included in the second CORESET.

\* \* \* \* \*